US012768949B2

(12) United States Patent
Wang et al.

(10) Patent No.: US 12,768,949 B2
(45) Date of Patent: Oct. 20, 2026

(54) DUAL EMITTING CO-AXIAL LiDAR SYSTEM WITH ZERO BLIND ZONE

(71) Applicant: Innovusion, Inc., Sunnyvale, CA (US)

(72) Inventors: Haosen Wang, Sunnyvale, CA (US); Junwei Bao, Los Altos, CA (US)

(73) Assignee: SEYOND, INC., Sunnyvale, CA (US)

( * ) Notice: Subject to any disclaimer, the term of this patent is extended or adjusted under 35 U.S.C. 154(b) by 736 days.

(21) Appl. No.: 18/196,298

(22) Filed: May 11, 2023

(65) Prior Publication Data

US 2023/0366984 A1 Nov. 16, 2023

Related U.S. Application Data

(60) Provisional application No. 63/342,047, filed on May 13, 2022.

(51) Int. Cl.

*G01S 17/10* (2020.01)
*G01S 7/481* (2006.01)
*G01S 7/4865* (2020.01)

(52) U.S. Cl.

CPC .......... *G01S 7/4812* (2013.01); *G01S 7/4815* (2013.01); *G01S 7/4817* (2013.01); *G01S 7/4865* (2013.01); *G01S 17/10* (2013.01)

(58) Field of Classification Search

None

See application file for complete search history.

(56) References Cited

U.S. PATENT DOCUMENTS 3,897,150 A 7/1975 Bridges et al.
4,464,048 A 8/1984 Farlow
(Continued)

FOREIGN PATENT DOCUMENTS

CN 1677050 A 10/2005
CN 204758260 U 11/2015
(Continued)

OTHER PUBLICATIONS

International Search Report and Written Opinion, dated Sep. 21, 2023 for International Application No. PCT/US2023/021947, 13 pages.

(Continued)

*Primary Examiner* — Eileen M Adams
(74) *Attorney, Agent, or Firm* — MASCHOFF BRENNAN; Liang Huang

(57) ABSTRACT

A dual emitting co-axial light detection and ranging (LiDAR) system is provided. The LiDAR system comprises a first light source configured to provide a first light beam, a second light source configured to provide a second light beam, a light detector configured to detect return light, one or more optical elements configured to transmit the first light beam to a target in a field of view and to direct return light to the light detector, a first light detector configured to detect the return light and internally-reflected light, a second light detector configured to detect return light formed from the second light beam, and control circuitry configured to mitigate a blind-zone effect based on the detected return light formed from the second light beam. The one or more optical elements are disposed outside of a light path of the second light beam from the second light source.

20 Claims, 13 Drawing Sheets

(56) References Cited

U.S. PATENT DOCUMENTS

| | | | |
|---|---|---|---|
| 5,006,721 | A | 4/1991 | Cameron et al. |
| 5,157,451 | A | 10/1992 | Taboada et al. |
| 5,319,434 | A | 6/1994 | Croteau et al. |
| 5,369,661 | A | 11/1994 | Yamaguchi et al. |
| 5,442,358 | A | 8/1995 | Keeler et al. |
| 5,546,188 | A | 8/1996 | Wangler et al. |
| 5,579,153 | A | 11/1996 | Laming et al. |
| 5,657,077 | A | 8/1997 | DeAngelis et al. |
| 5,793,491 | A | 8/1998 | Wangler et al. |
| 5,838,239 | A | 11/1998 | Stern et al. |
| 5,864,391 | A | 1/1999 | Hosokawa et al. |
| 5,926,259 | A | 7/1999 | Bamberger et al. |
| 5,936,756 | A | 8/1999 | Nakajima |
| 6,163,378 | A | 12/2000 | Khoury |
| 6,317,202 | B1 | 11/2001 | Hosokawa et al. |
| 6,594,000 | B2 | 7/2003 | Green et al. |
| 6,650,404 | B1 | 11/2003 | Crawford |
| 6,950,733 | B2 | 9/2005 | Stopczynski |
| 7,128,267 | B2 | 10/2006 | Reichenbach et al. |
| 7,202,941 | B2 | 4/2007 | Munro |
| 7,345,271 | B2 | 3/2008 | Boehlau et al. |
| 7,440,084 | B2 | 10/2008 | Kane |
| 7,440,175 | B2 | 10/2008 | Di Teodoro et al. |
| 7,489,865 | B2 | 2/2009 | Varshneya et al. |
| 7,576,837 | B2 | 8/2009 | Liu et al. |
| 7,830,527 | B2 | 11/2010 | Chen |
| 7,835,068 | B1 | 11/2010 | Brooks et al. |
| 7,847,235 | B2 | 12/2010 | Krupkin et al. |
| 7,880,865 | B2 | 2/2011 | Tanaka et al. |
| 7,936,448 | B2 | 5/2011 | Albuquerque et al. |
| 7,969,558 | B2 | 6/2011 | Hall |
| 7,982,861 | B2 | 7/2011 | Abshire et al. |
| 8,072,582 | B2 | 12/2011 | Meneely |
| 8,471,895 | B2 | 6/2013 | Banks |
| 8,736,818 | B2 | 5/2014 | Weimer et al. |
| 8,749,764 | B2 | 6/2014 | Hsu et al. |
| 8,812,149 | B2 | 8/2014 | Doak |
| 8,984,928 | B2 | 3/2015 | Shiraishi |
| 9,048,616 | B1 | 6/2015 | Robinson |
| 9,065,243 | B2 | 6/2015 | Asobe et al. |
| 9,086,273 | B1 | 7/2015 | Gruver et al. |
| 9,194,701 | B2 | 11/2015 | Bosch |
| 9,255,790 | B2 | 2/2016 | Zhu |
| 9,300,321 | B2 | 3/2016 | Zalik et al. |
| 9,304,316 | B2 | 4/2016 | Weiss et al. |
| 9,316,724 | B2 | 4/2016 | Gehring et al. |
| 9,354,485 | B2 | 5/2016 | Fermann et al. |
| 9,510,505 | B2 | 12/2016 | Halloran et al. |
| 9,575,184 | B2 | 2/2017 | Gilliland et al. |
| 9,605,998 | B2 | 3/2017 | Nozawa |
| 9,621,876 | B2 | 4/2017 | Federspiel |
| 9,638,799 | B2 | 5/2017 | Goodwin et al. |
| 9,696,426 | B2 | 7/2017 | Zuk et al. |
| 9,702,966 | B2 | 7/2017 | Batcheller et al. |
| 9,804,264 | B2 | 10/2017 | Villeneuve et al. |
| 9,810,786 | B1 | 11/2017 | Welford et al. |
| 9,812,838 | B2 | 11/2017 | Villeneuve et al. |
| 9,823,353 | B2 | 11/2017 | Eichenholz et al. |
| 9,857,468 | B1 | 1/2018 | Eichenholz et al. |
| 9,869,754 | B1 | 1/2018 | Campbell et al. |
| 9,880,263 | B2 | 1/2018 | Droz et al. |
| 9,880,278 | B2 | 1/2018 | van Uffelen et al. |
| 9,885,778 | B2 | 2/2018 | Dussan |
| 9,897,689 | B2 | 2/2018 | Dussan |
| 9,915,726 | B2 | 3/2018 | Bailey et al. |
| 9,927,915 | B2 | 3/2018 | Frame et al. |
| 9,958,545 | B2 | 5/2018 | Eichenholz et al. |
| 10,007,001 | B1 | 6/2018 | LaChapelle et al. |
| 10,012,732 | B2 | 7/2018 | Eichenholz et al. |
| 10,042,159 | B2 | 8/2018 | Dussan et al. |
| 10,061,019 | B1 | 8/2018 | Campbell et al. |
| 10,073,166 | B2 | 9/2018 | Dussan |
| 10,078,133 | B2 | 9/2018 | Dussan |
| 10,094,925 | B1 | 10/2018 | LaChapelle |
| 10,157,630 | B2 | 12/2018 | Vaughn et al. |
| 10,191,155 | B2 | 1/2019 | Curatu |
| 10,215,847 | B2 | 2/2019 | Scheim et al. |
| 10,267,898 | B2 | 4/2019 | Campbell et al. |
| 10,295,656 | B1 | 5/2019 | Li et al. |
| 10,310,058 | B1 | 6/2019 | Campbell et al. |
| 10,324,170 | B1 | 6/2019 | Engberg, Jr. et al. |
| 10,324,185 | B2 | 6/2019 | McWhirter et al. |
| 10,393,877 | B2 | 8/2019 | Hall et al. |
| 10,429,495 | B1 | 10/2019 | Wang et al. |
| 10,444,356 | B2 | 10/2019 | Wu et al. |
| 10,451,716 | B2 | 10/2019 | Hughes et al. |
| 10,466,342 | B1 | 11/2019 | Zhu et al. |
| 10,502,831 | B2 | 12/2019 | Eichenholz |
| 10,509,112 | B1 | 12/2019 | Pan |
| 10,520,602 | B2 | 12/2019 | Villeneuve et al. |
| 10,557,923 | B2 | 2/2020 | Watnik et al. |
| 10,571,567 | B2 | 2/2020 | Campbell et al. |
| 10,578,720 | B2 | 3/2020 | Hughes et al. |
| 10,591,600 | B2 | 3/2020 | Villeneuve et al. |
| 10,627,491 | B2 | 4/2020 | Hall et al. |
| 10,641,872 | B2 | 5/2020 | Dussan et al. |
| 10,663,564 | B2 | 5/2020 | LaChapelle |
| 10,663,585 | B2 | 5/2020 | McWhirter |
| 10,663,596 | B2 | 5/2020 | Dussan et al. |
| 10,684,360 | B2 | 6/2020 | Campbell |
| 10,908,262 | B2 | 2/2021 | Dussan |
| 10,908,265 | B2 | 2/2021 | Dussan |
| 10,908,268 | B2 | 2/2021 | Zhou et al. |
| 10,969,475 | B2 | 4/2021 | Li et al. |
| 10,983,218 | B2 | 4/2021 | Hall et al. |
| 11,002,835 | B2 | 5/2021 | Pan et al. |
| 11,009,605 | B2 | 5/2021 | Li et al. |
| 11,194,048 | B1 | 12/2021 | Burbank et al. |
| 2002/0136251 | A1 | 9/2002 | Green et al. |
| 2004/0135992 | A1 | 7/2004 | Munro |
| 2005/0033497 | A1 | 2/2005 | Stopczynski |
| 2005/0190424 | A1 | 9/2005 | Reichenbach et al. |
| 2005/0195383 | A1 | 9/2005 | Breed et al. |
| 2006/0071846 | A1 | 4/2006 | Yanagisawa et al. |
| 2006/0132752 | A1 | 6/2006 | Kane |
| 2007/0091948 | A1 | 4/2007 | Di Teodoro et al. |
| 2007/0216995 | A1 | 9/2007 | Bollond et al. |
| 2008/0174762 | A1 | 7/2008 | Liu et al. |
| 2008/0193135 | A1 | 8/2008 | Du et al. |
| 2009/0010644 | A1 | 1/2009 | Varshneya et al. |
| 2009/0051926 | A1 | 2/2009 | Chen |
| 2009/0059201 | A1 | 3/2009 | Willner et al. |
| 2009/0067453 | A1 | 3/2009 | Mizuuchi et al. |
| 2009/0147239 | A1 | 6/2009 | Zhu et al. |
| 2009/0262760 | A1 | 10/2009 | Krupkin et al. |
| 2009/0316134 | A1 | 12/2009 | Michael et al. |
| 2010/0006760 | A1 | 1/2010 | Lee et al. |
| 2010/0020306 | A1 | 1/2010 | Hall |
| 2010/0020377 | A1 | 1/2010 | Borchers et al. |
| 2010/0027602 | A1 | 2/2010 | Abshire et al. |
| 2010/0045965 | A1 | 2/2010 | Meneely |
| 2010/0053715 | A1 | 3/2010 | O'Neill et al. |
| 2010/0128109 | A1 | 5/2010 | Banks |
| 2010/0271614 | A1 | 10/2010 | Albuquerque et al. |
| 2011/0181864 | A1 | 7/2011 | Schmitt et al. |
| 2012/0038903 | A1 | 2/2012 | Weimer et al. |
| 2012/0124113 | A1 | 5/2012 | Zalik et al. |
| 2012/0221142 | A1 | 8/2012 | Doak |
| 2013/0107016 | A1 | 5/2013 | Federspiel |
| 2013/0116971 | A1 | 5/2013 | Retkowski et al. |
| 2013/0241761 | A1 | 9/2013 | Cooper et al. |
| 2013/0293867 | A1 | 11/2013 | Hsu et al. |
| 2013/0293946 | A1 | 11/2013 | Fermann et al. |
| 2013/0329279 | A1 | 12/2013 | Nati et al. |
| 2013/0342822 | A1 | 12/2013 | Shiraishi |
| 2014/0078514 | A1 | 3/2014 | Zhu |
| 2014/0104594 | A1 | 4/2014 | Gammenthaler |
| 2014/0347650 | A1 | 11/2014 | Bösch |
| 2014/0350836 | A1 | 11/2014 | Stettner et al. |
| 2015/0078123 | A1 | 3/2015 | Batcheller et al. |
| 2015/0084805 | A1 | 3/2015 | Dawber |
| 2015/0109603 | A1 | 4/2015 | Kim et al. |
| 2015/0116692 | A1 | 4/2015 | Zuk et al. |
| 2015/0139259 | A1 | 5/2015 | Robinson |

(56) References Cited

U.S. PATENT DOCUMENTS

| | | | | |
|---|---|---|---|---|
| 2015/0158489 | A1 | 6/2015 | Oh et al. | |
| 2015/0338270 | A1 | 11/2015 | Williams et al. | |
| 2015/0355327 | A1 | 12/2015 | Goodwin et al. | |
| 2016/0003946 | A1 | 1/2016 | Gilliland et al. | |
| 2016/0047896 | A1 | 2/2016 | Dussan | |
| 2016/0047900 | A1 | 2/2016 | Dussan | |
| 2016/0061655 | A1 | 3/2016 | Nozawa | |
| 2016/0061935 | A1 | 3/2016 | McCloskey et al. | |
| 2016/0100521 | A1 | 4/2016 | Halloran et al. | |
| 2016/0117048 | A1 | 4/2016 | Frame et al. | |
| 2016/0172819 | A1 | 6/2016 | Ogaki | |
| 2016/0178736 | A1 | 6/2016 | Chung | |
| 2016/0226210 | A1 | 8/2016 | Zayhowski et al. | |
| 2016/0245902 | A1 | 8/2016 | Watnik | |
| 2016/0291134 | A1 | 10/2016 | Droz et al. | |
| 2016/0313445 | A1 | 10/2016 | Bailey et al. | |
| 2016/0327646 | A1 | 11/2016 | Scheim et al. | |
| 2017/0003116 | A1 | 1/2017 | Yee et al. | |
| 2017/0153319 | A1 | 6/2017 | Villeneuve et al. | |
| 2017/0242104 | A1 | 8/2017 | Dussan | |
| 2017/0299721 | A1 | 10/2017 | Eichenholz et al. | |
| 2017/0307738 | A1 | 10/2017 | Schwarz et al. | |
| 2017/0365105 | A1 | 12/2017 | Rao et al. | |
| 2018/0040171 | A1 | 2/2018 | Kundu et al. | |
| 2018/0050704 | A1 | 2/2018 | Tascione et al. | |
| 2018/0069367 | A1 | 3/2018 | Villeneuve et al. | |
| 2018/0152691 | A1 | 5/2018 | Pacala et al. | |
| 2018/0156896 | A1 | 6/2018 | O'Keeffe | |
| 2018/0158471 | A1 | 6/2018 | Vaughn et al. | |
| 2018/0164439 | A1 | 6/2018 | Droz et al. | |
| 2018/0188355 | A1 | 7/2018 | Bao et al. | |
| 2018/0188357 | A1 | 7/2018 | Li et al. | |
| 2018/0188358 | A1* | 7/2018 | Li | G01S 7/4865 |
| 2018/0188371 | A1 | 7/2018 | Bao et al. | |
| 2018/0210084 | A1 | 7/2018 | Zwölfer et al. | |
| 2018/0275274 | A1 | 9/2018 | Bao et al. | |
| 2018/0284241 | A1 | 10/2018 | Campbell et al. | |
| 2018/0284242 | A1 | 10/2018 | Campbell | |
| 2018/0284286 | A1 | 10/2018 | Eichenholz et al. | |
| 2018/0329060 | A1 | 11/2018 | Pacala et al. | |
| 2018/0359460 | A1 | 12/2018 | Pacala et al. | |
| 2019/0025428 | A1 | 1/2019 | Li et al. | |
| 2019/0107607 | A1 | 4/2019 | Danziger | |
| 2019/0107623 | A1 | 4/2019 | Campbell et al. | |
| 2019/0120942 | A1 | 4/2019 | Zhang et al. | |
| 2019/0120962 | A1 | 4/2019 | Gimpel et al. | |
| 2019/0154804 | A1 | 5/2019 | Eichenholz | |
| 2019/0154807 | A1 | 5/2019 | Steinkogler et al. | |
| 2019/0212416 | A1 | 7/2019 | Li et al. | |
| 2019/0250254 | A1 | 8/2019 | Campbell et al. | |
| 2019/0257924 | A1 | 8/2019 | Li et al. | |
| 2019/0265334 | A1 | 8/2019 | Zhang et al. | |
| 2019/0265336 | A1 | 8/2019 | Zhang et al. | |
| 2019/0265337 | A1 | 8/2019 | Zhang et al. | |
| 2019/0265339 | A1 | 8/2019 | Zhang et al. | |
| 2019/0277952 | A1 | 9/2019 | Beuschel et al. | |
| 2019/0310368 | A1 | 10/2019 | LaChapelle | |
| 2019/0369215 | A1 | 12/2019 | Wang et al. | |
| 2019/0369258 | A1 | 12/2019 | Hall et al. | |
| 2019/0383915 | A1 | 12/2019 | Li et al. | |
| 2020/0132839 | A1 | 4/2020 | Muller | |
| 2020/0142039 | A1* | 5/2020 | Liu | G01S 7/4865 |
| 2020/0142070 | A1 | 5/2020 | Hall et al. | |
| 2020/0256964 | A1 | 8/2020 | Campbell et al. | |
| 2020/0284906 | A1 | 9/2020 | Eichenholz et al. | |
| 2020/0319310 | A1 | 10/2020 | Hall et al. | |
| 2020/0400798 | A1 | 12/2020 | Rezk et al. | |
| 2021/0088630 | A9 | 3/2021 | Zhang | |
| 2021/0165094 | A1 | 6/2021 | Droz et al. | |
| 2022/0107409 | A1* | 4/2022 | Kholoburdin | G01S 7/4815 |
| 2023/0073060 | A1* | 3/2023 | Wang | G01S 7/4817 |
| 2023/0176198 | A1* | 6/2023 | Mielke | G01S 17/10<br>356/4.01 |
| 2023/0324526 | A1 | 10/2023 | Wan et al. | |

FOREIGN PATENT DOCUMENTS

| | | | |
|---|---|---|---|
| CN | 204885804 | U | 12/2015 |
| CN | 108132472 | A | 6/2018 |
| CN | 207457508 | U | 6/2018 |
| CN | 207557465 | U | 6/2018 |
| CN | 208314210 | U | 1/2019 |
| CN | 208421228 | U | 1/2019 |
| CN | 208705506 | U | 4/2019 |
| CN | 106597471 | B | 5/2019 |
| CN | 209280923 | U | 8/2019 |
| CN | 108445468 | B | 11/2019 |
| CN | 110031823 | B | 3/2020 |
| CN | 108089201 | B | 4/2020 |
| CN | 108594206 | B | 4/2020 |
| CN | 109116331 | B | 4/2020 |
| CN | 109917408 | B | 4/2020 |
| CN | 109116366 | B | 5/2020 |
| CN | 109116367 | B | 5/2020 |
| CN | 110031822 | B | 5/2020 |
| CN | 211655309 | U | 10/2020 |
| CN | 109188397 | B | 11/2020 |
| CN | 109814086 | B | 11/2020 |
| CN | 109917348 | B | 11/2020 |
| CN | 110492856 | B | 11/2020 |
| CN | 110736975 | B | 11/2020 |
| CN | 109725320 | B | 12/2020 |
| CN | 110780284 | B | 12/2020 |
| CN | 110780283 | B | 1/2021 |
| CN | 110784220 | B | 2/2021 |
| CN | 212623082 | U | 2/2021 |
| CN | 110492349 | B | 3/2021 |
| CN | 109950784 | B | 5/2021 |
| CN | 213182011 | U | 5/2021 |
| CN | 213750313 | U | 7/2021 |
| CN | 214151038 | U | 9/2021 |
| CN | 109814082 | B | 10/2021 |
| CN | 113491043 | A | 10/2021 |
| CN | 214795200 | U | 11/2021 |
| CN | 214795206 | U | 11/2021 |
| CN | 214895784 | U | 11/2021 |
| CN | 214895810 | U | 11/2021 |
| CN | 215641806 | U | 1/2022 |
| CN | 112639527 | B | 2/2022 |
| CN | 215932142 | U | 3/2022 |
| CN | 112578396 | B | 4/2022 |
| CN | 115267727 | A | 11/2022 |
| CN | 223296134 | U | 9/2025 |
| EP | 0 757 257 | A2 | 2/1997 |
| EP | 1 237 305 | A2 | 9/2002 |
| EP | 1 923 721 | A1 | 5/2008 |
| EP | 2 157 445 | A2 | 2/2010 |
| EP | 2 395 368 | A1 | 12/2011 |
| EP | 2 889 642 | A1 | 7/2015 |
| GB | 1 427 164 | A | 3/1976 |
| GB | 2 000 411 | A | 1/1979 |
| JP | 2007144667 | A | 6/2007 |
| JP | 2010035385 | A | 2/2010 |
| JP | 2017003347 | A | 1/2017 |
| JP | 2017138301 | A | 8/2017 |
| KR | 10-2012-0013515 | A | 2/2012 |
| KR | 10-2013-0068224 | A | 6/2013 |
| KR | 10-2018-0107673 | A | 10/2018 |
| WO | 2017/110417 | A1 | 6/2017 |
| WO | 2018/125725 | A1 | 7/2018 |
| WO | 2018/129408 | A1 | 7/2018 |
| WO | 2018/129409 | A1 | 7/2018 |
| WO | 2018/129410 | A1 | 7/2018 |
| WO | 2018/175990 | A1 | 9/2018 |
| WO | 2018/182812 | A2 | 10/2018 |
| WO | 2019/079642 | A1 | 4/2019 |
| WO | 2019/165095 | A1 | 8/2019 |
| WO | 2019/165289 | A1 | 8/2019 |

(56) References Cited

FOREIGN PATENT DOCUMENTS

| | | | |
|---|---|---|---|
| WO | 2019/165294 | A1 | 8/2019 |
| WO | 2020/013890 | A2 | 1/2020 |
| WO | 2021126083 | A1 | 6/2021 |

OTHER PUBLICATIONS

Chen, X, et al. (Feb. 2010). "Polarization Coupling of Light and Optoelectronics Devices Based on Periodically Poled Lithium Niobate," Shanghai Jiao Tong University, China, Frontiers in Guided Wave Optics and Optoelectronics, 24 pages.

European Search Report, dated Jul. 17, 2020, for EP Application No. 18776977.3, 12 pages.

European Search Report, dated Jun. 17, 2021, for EP Application No. 18868896.4, 7 pages.

Extended European Search Report, dated Jul. 10, 2020, for EP Application No. 18736738.8, 9 pages.

Extended European Search Report, dated Jul. 22, 2020, for EP Application No. 18736685.1. 10 pages.

Fiber laser, Wikipedia, https://en.wikipedia.org/wiki/Fiber_laser, 6 pages.

Gluckman, J. (May 13, 2016). "Design of the processing chain for a high-altitude, airborne, single-photon lidar mapping instrument," Proceedings of SPIE; [Proceedings of SPIE ISSN 0277-786X vol. 10524], SPIE, US, vol. 9832, 9 pages.

Goldstein, R. (Apr. 1986) "Electro-Optic Devices in Review, The Linear Electro-Optic (Pockels) Effect Forms the Basis for a Family of Active Devices," Laser & Applications, FastPulse Technology, Inc., 6 pages.

Gunzung, Kim, et al. (Mar. 2, 2016). "A hybrid 3D LIDAR imager based on pixel-by-pixel scanning and DS-OCDMA," pages Proceedings of SPIE [Proceedings of SPIE ISSN 0277-786X vol. 10524], SPIE, US, vol. 9751, pp. 975119-975119-8.

International Preliminary Report on Patentability, dated Apr. 30, 2020, for International Application No. PCT/US2018/056577, 8 pages.

International Preliminary Report on Patentability, dated Jul. 9, 2019, for International Application No. PCT/US2018/012703, 10 pages.

International Preliminary Report on Patentability, dated Jul. 9, 2019, for International Application No. PCT/US2018/012704, 7 pages.

International Preliminary Report on Patentability, dated Jul. 9, 2019, for International Application No. PCT/US2018/012705, 7 pages.

International Search Report and Written Opinion, dated Jan. 17, 2020, for International Application No. PCT/US2019/019276, 14 pages.

International Search Report and Written Opinion, dated Jan. 3, 2019, for International Application No. PCT/US2018/056577, 15 pages.

International Search Report and Written Opinion, dated Jul. 9, 2019, for International Application No. PCT/US2019/018987, 17 pages.

International Search Report and Written Opinion, dated Jun. 7, 2018, for International Application No. PCT/US2018/024185, 9 pages.

International Search Report and Written Opinion, dated Mar. 19, 2018, for International Application No. PCT/US2018/012705, 12 pages.

International Search Report and Written Opinion, dated Mar. 20, 2018, for International Application No. PCT/US2018/012703, 13 pages.

International Search Report and Written Opinion, dated Mar. 23, 2018, for International Application No. PCT/US2018/012704, 12 pages.

International Search Report and Written Opinion, dated May 3, 2019, for International Application No. PCT/US2019/019272, 16 pages.

International Search Report and Written Opinion, dated May 6, 2019, for International Application No. PCT/US2019/019264, 15 pages.

International Search Report and Written Opinion, dated Sep. 18, 2018, for International Application No. PCT/US2018/012116, 12 pages.

Mirrors, Physics LibreTexts, https://phys.libretexts.org/Bookshelves/Optics/Supplemental_Modules_(Components)/Mirrors, (2021), 2 pages.

Office Action Issued in Japanese Patent Application No. 2019-536019 dated Nov. 30, 2021, 6 pages.

"Why Wavelengths Matter in Fiber Optics", FirstLight, https://www.firstlight.net/why-wavelengths-matter-in-fiber-optics/, (2021), 5 pages.

* cited by examiner

DUAL EMITTING CO-AXIAL LiDAR SYSTEM WITH ZERO BLIND ZONE

CROSS-REFERENCE TO RELATED APPLICATIONS

This application claims priority to U.S. Provisional Patent Application Ser. No. 63/342,047, filed May 13, 2022, entitled "Dual Emitting Co-Axial LiDAR System With Zero Blind Zone," the content of which is hereby incorporated by reference in its entirety for all purposes.

FIELD OF THE TECHNOLOGY

This disclosure relates generally to optical scanning and, more particularly, to a dual emitting co-axial light detection and ranging (LiDAR) system.

BACKGROUND

Light detection and ranging (LiDAR) systems use light pulses to create an image or point cloud of the external environment. A LiDAR system may be a scanning or non-scanning system. Some typical scanning LiDAR systems include a light source, a light transmitter, a light steering system, and a light detector. The light source generates a light beam that is directed by the light steering system in particular directions when being transmitted from the LiDAR system. When a transmitted light beam is scattered or reflected by an object, a portion of the scattered or reflected light returns to the LiDAR system to form a return light pulse. The light detector detects the return light pulse. Using the difference between the time that the return light pulse is detected and the time that a corresponding light pulse in the light beam is transmitted, the LiDAR system can determine the distance to the object based on the speed of light. This technique of determining the distance is referred to as the time-of-flight (ToF) technique. The light steering system can direct light beams along different paths to allow the LiDAR system to scan the surrounding environment and produce images or point clouds. A typical non-scanning LiDAR system illuminate an entire field-of-view (FOV) rather than scanning through the FOV. An example of the non-scanning LiDAR system is a flash LiDAR, which can also use the ToF technique to measure the distance to an object. LiDAR systems can also use techniques other than time-of-flight and scanning to measure the surrounding environment.

SUMMARY

Embodiments described herein refer to systems and methods for LiDAR scanning using dual emitting co-axial LiDAR systems. A LiDAR system scans the external environment and uses the time-of-flight technique to determine distance to objects in the external environment. Time-of-flight of a light pulse is measured from the time when an outgoing light pulse is generated by a light source of the LiDAR system to the time when the return light pulse scattered by the objects is detected by a light detector of the LiDAR system. Distance to the objects can then be calculated by multiplying the time-of-flight and the speed of light.

Co-axial optical design is a popular choice for LiDAR systems due to its compact size. In a coaxial LiDAR system, the laser emission path and the light reception path are substantially co-axial or parallel within the system. A co-axial LiDAR system can be highly compact because it has optics that are shared by both the laser emission path and the light reception path. However, a drawback of the co-axial LiDAR system is that it may cause a "blind-zone" effect.

A "blind zone" of a LiDAR system refers to a specific zone within the LiDAR system's field-of-view where it cannot detect or accurately measure objects that fall within the zone. Blind-zone effect is mainly caused by light being partially reflected from one or more lenses in the system and then detected by the light detector. Although lenses are mainly configured to pass through light while collimating, focusing, or redirecting the light towards a particular direction, some lenses may, because of its material, reflect a small fraction of the light back into the system. This small fraction of reflected light, along with lights reflected by objects in the field-of-view, may both be detected by the light detector. This can lead to errors in the "time-of-flight" calculation and the inability to detect objects in close proximity. The blind-zone may be located, for example, in one to two meters from the LiDAR system. The existence of a blind-zone may significantly impact the LiDAR system's performance. This disclosure presents a novel design that utilizes two emitter systems in a co-axial LiDAR system to eliminate the blind-zone.

In one embodiment, a dual emitting co-axial light detection and ranging (LiDAR) system is provided. The LiDAR system comprises a first light source configured to provide a first light beam, a second light source configured to provide a second light beam, a light detector configured to detect return light, one or more optical elements configured to transmit the first light beam from the first light source to a target in a field of view and to direct return light to the light detector, a first light detector configured to detect the return light and internally-reflected light formed by partially reflecting the first light beam by at least one of the one or more optical elements, a second light detector configured to detect return light formed from the second light beam, and control circuitry configured to mitigate a blind-zone effect resulting from the detected internally-reflected light, based on the detected return light formed from the second light beam. The one or more optical elements are disposed outside of a light path of the second light beam from the second light source.

In another embodiment, a method for performing LiDAR scanning with zero blind-zone using a dual emitting co-axial LiDAR system is provided. The method is performed by the dual emitting co-axial LiDAR system and comprises directing a first light beam provided by a first light source to one or more target objects along a first light path, receiving return light along the first light path, and directing a second light beam provided by a second light source to the one or more target objects along a second light path. The first light path and the second light path are different light paths that do not share one or more optical elements. The method further comprises detecting, by a first light detector, the return light along the first light path and internally-reflected light formed from the one or more optical elements along the first light path, detecting, by a second light detector, return light along the second light path, and mitigating, by control circuitry, a blind-zone effect resulting from the detected the internally-reflected light formed from the one or more optical elements along the first light path, based on the detected return light along the second light path.

BRIEF DESCRIPTION OF THE DRAWINGS

The present application can be best understood by reference to the embodiments described below taken in conjunction with the accompanying drawing figures, in which like parts may be referred to by like numerals.

DETAILED DESCRIPTION

Figure 1:
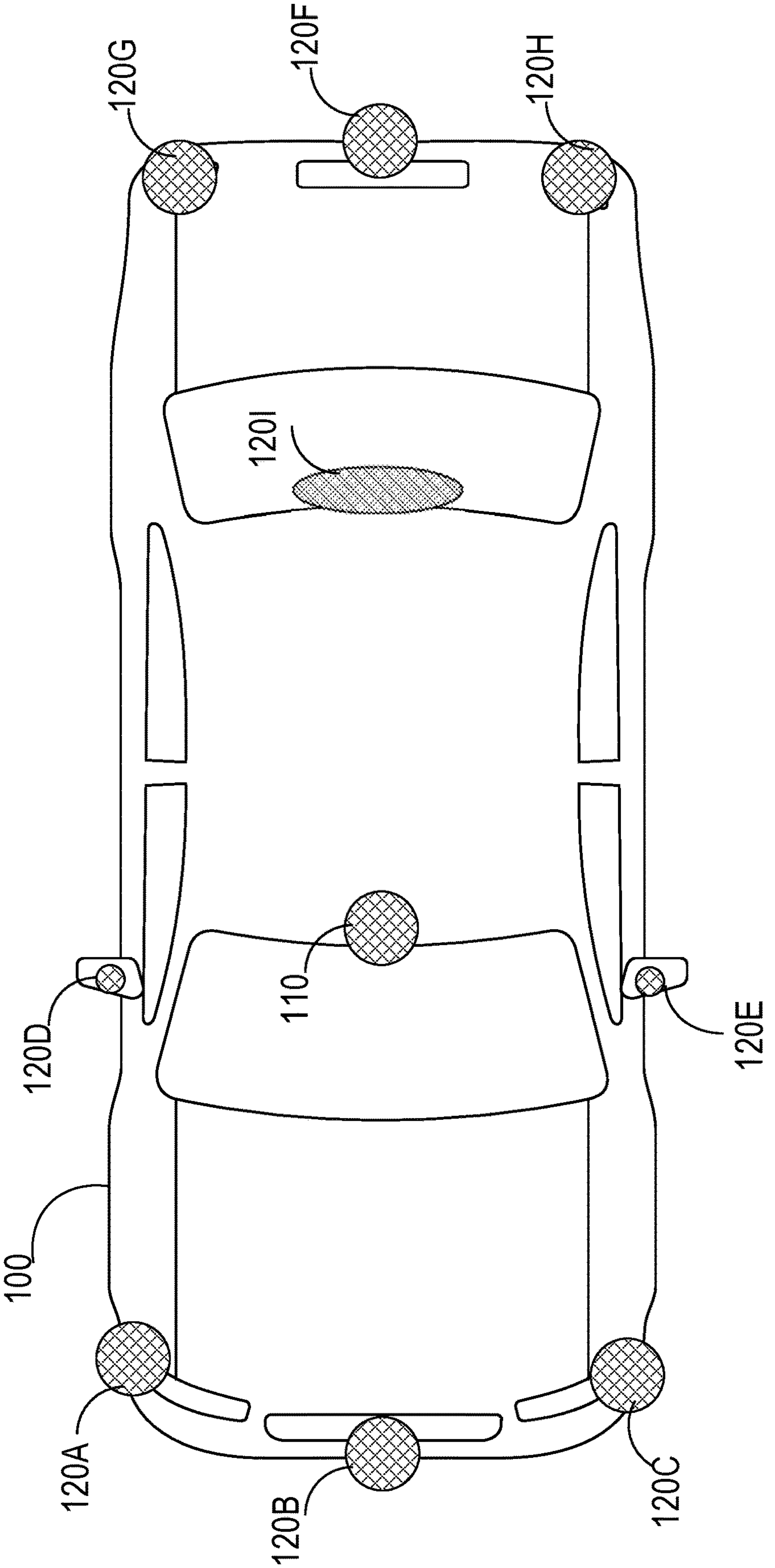
FIG. 1 illustrates one or more example LiDAR systems disposed or included in a motor vehicle.

To provide a more thorough understanding of various embodiments of the present invention, the following description sets forth numerous specific details, such as specific configurations, parameters, examples, and the like. It should be recognized, however, that such description is not intended as a limitation on the scope of the present invention but is intended to provide a better description of the exemplary embodiments.

Throughout the specification and claims, the following terms take the meanings explicitly associated herein, unless the context clearly dictates otherwise:

The phrase "in one embodiment" as used herein does not necessarily refer to the same embodiment, though it may. Thus, as described below, various embodiments of the disclosure may be readily combined, without departing from the scope or spirit of the invention.

As used herein, the term "or" is an inclusive "or" operator and is equivalent to the term "and/or," unless the context clearly dictates otherwise.

The term "based on" is not exclusive and allows for being based on additional factors not described unless the context clearly dictates otherwise.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of a networked environment where two or more components or devices are able to exchange data, the terms "coupled to" and "coupled with" are also used to mean "communicatively coupled with", possibly via one or more intermediary devices. The components or devices can be optical, mechanical, and/or electrical devices.

Although the following description uses terms "first," "second," etc. to describe various elements, these elements should not be limited by the terms. These terms are only used to distinguish one element from another. For example, a first sensor could be termed a second sensor and, similarly, a second sensor could be termed a first sensor, without departing from the scope of the various described examples. The first sensor and the second sensor can both be sensors and, in some cases, can be separate and different sensors.

In addition, throughout the specification, the meaning of "a", "an", and "the" includes plural references, and the meaning of "in" includes "in" and "on".

Although some of the various embodiments presented herein constitute a single combination of inventive elements, it should be appreciated that the inventive subject matter is considered to include all possible combinations of the disclosed elements. As such, if one embodiment comprises elements A, B, and C, and another embodiment comprises elements B and D, then the inventive subject matter is also considered to include other remaining combinations of A, B, C, or D, even if not explicitly discussed herein. Further, the transitional term "comprising" means to have as parts or members, or to be those parts or members. As used herein, the transitional term "comprising" is inclusive or open-ended and does not exclude additional, unrecited elements or method steps.

As used in the description herein and throughout the claims that follow, when a system, engine, server, device, module, or other computing element is described as being configured to perform or execute functions on data in a memory, the meaning of "configured to" or "programmed to" is defined as one or more processors or cores of the computing element being programmed by a set of software instructions stored in the memory of the computing element to execute the set of functions on target data or data objects stored in the memory.

It should be noted that any language directed to a computer should be read to include any suitable combination of computing devices or network platforms, including servers, interfaces, systems, databases, agents, peers, engines, controllers, modules, or other types of computing devices operating individually or collectively. One should appreciate the computing devices comprise a processor configured to execute software instructions stored on a tangible, non-transitory computer readable storage medium (e.g., hard drive, FPGA, PLA, solid state drive, RAM, flash, ROM, or any other volatile or non-volatile storage devices). The software instructions configure or program the computing device to provide the roles, responsibilities, or other functionality as discussed below with respect to the disclosed apparatus. Further, the disclosed technologies can be embodied as a computer program product that includes a non-transitory computer readable medium storing the software instructions that causes a processor to execute the disclosed steps associated with implementations of computer-based algorithms, processes, methods, or other instructions. In some embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges among devices can be conducted over a packet-switched network, the Internet, LAN, WAN, VPN, or other type of packet switched network; a circuit switched network; cell switched network; or other type of network.

Embodiments of the present invention are described below. In various embodiments of the present invention, a dual emitting co-axial light detection and ranging (LiDAR) system is provided. The LiDAR system comprises a first light source configured to provide a first light beam, a second light source configured to provide a second light beam, a light detector configured to detect return light, one or more optical elements configured to transmit the first light beam from the first light source to a target in a field of view and to direct return light to the light detector, a first light detector configured to detect the return light and internally-reflected light formed by partially reflecting the first light beam by at least one of the one or more optical elements, a second light detector configured to detect return light formed from the second light beam, and control circuitry configured to mitigate a blind-zone effect resulting from the detected internally-reflected light, based on the detected return light formed from the second light beam. The one or more optical elements are disposed outside of a light path of the second light beam from the second light source.

FIG. 1 illustrates one or more example LiDAR systems 110 disposed or included in a motor vehicle 100. Vehicle 100 can be a car, a sport utility vehicle (SUV), a truck, a train, a wagon, a bicycle, a motorcycle, a tricycle, a bus, a mobility scooter, a tram, a ship, a boat, an underwater vehicle, an airplane, a helicopter, an unmanned aviation vehicle (UAV), a spacecraft, etc. Motor vehicle 100 can be a vehicle having any automated level. For example, motor vehicle 100 can be a partially automated vehicle, a highly automated vehicle, a fully automated vehicle, or a driverless vehicle. A partially automated vehicle can perform some driving functions without a human driver's intervention. For example, a partially automated vehicle can perform blind-spot monitoring, lane keeping and/or lane changing operations, automated emergency braking, smart cruising and/or traffic following, or the like. Certain operations of a partially automated vehicle may be limited to specific applications or driving scenarios (e.g., limited to only freeway driving). A highly automated vehicle can generally perform all operations of a partially automated vehicle but with less limitations. A highly automated vehicle can also detect its own limits in operating the vehicle and ask the driver to take over the control of the vehicle when necessary. A fully automated vehicle can perform all vehicle operations without a driver's intervention but can also detect its own limits and ask the driver to take over when necessary. A driverless vehicle can operate on its own without any driver intervention.

In typical configurations, motor vehicle 100 comprises one or more LiDAR systems 110 and 120A-120I. Each of LiDAR systems 110 and 120A-120I can be a scanning-based LiDAR system and/or a non-scanning LiDAR system (e.g., a flash LiDAR). A scanning-based LiDAR system scans one or more light beams in one or more directions (e.g., horizontal and vertical directions) to detect objects in a field-of-view (FOV). A non-scanning based LiDAR system transmits laser light to illuminate an FOV without scanning. For example, a flash LiDAR is a type of non-scanning based LiDAR system. A flash LiDAR can transmit laser light to simultaneously illuminate an FOV using a single light pulse or light shot.

A LiDAR system is a frequently-used sensor of a vehicle that is at least partially automated. In one embodiment, as shown in FIG. 1, motor vehicle 100 may include a single LiDAR system 110 (e.g., without LiDAR systems 120A-120I) disposed at the highest position of the vehicle (e.g., at the vehicle roof). Disposing LiDAR system 110 at the vehicle roof facilitates a 360-degree scanning around vehicle 100. In some other embodiments, motor vehicle 100 can include multiple LiDAR systems, including two or more of systems 110 and/or 120A-120I. As shown in FIG. 1, in one embodiment, multiple LiDAR systems 110 and/or 120A-120I are attached to vehicle 100 at different locations of the vehicle. For example, LiDAR system 120A is attached to vehicle 100 at the front right corner; LiDAR system 120B is attached to vehicle 100 at the front center position; LiDAR system 120C is attached to vehicle 100 at the front left corner; LiDAR system 120D is attached to vehicle 100 at the right-side rear view mirror; LiDAR system 120E is attached to vehicle 100 at the left-side rear view mirror; LiDAR system 120F is attached to vehicle 100 at the back center position; LiDAR system 120G is attached to vehicle 100 at the back right corner; LiDAR system 120H is attached to vehicle 100 at the back left corner; and/or LiDAR system 120I is attached to vehicle 100 at the center towards the backend (e.g., back end of the vehicle roof). It is understood that one or more LiDAR systems can be distributed and attached to a vehicle in any desired manner and FIG. 1 only illustrates one embodiment. As another example, LiDAR systems 120D and 120E may be attached to the B-pillars of vehicle 100 instead of the rear-view mirrors. As another example, LiDAR system 120B may be attached to the windshield of vehicle 100 instead of the front bumper.

In some embodiments, LiDAR systems 110 and 120A-120I are independent LiDAR systems having their own respective laser sources, control electronics, transmitters, receivers, and/or steering mechanisms. In other embodiments, some of LiDAR systems 110 and 120A-120I can share one or more components, thereby forming a distributed sensor system. In one example, optical fibers are used to deliver laser light from a centralized laser source to all LiDAR systems. For instance, system 110 (or another system that is centrally positioned or positioned anywhere inside the vehicle 100) includes a light source, a transmitter, and a light detector, but have no steering mechanisms. System 110 may distribute transmission light to each of systems 120A-120I. The transmission light may be distributed via optical fibers. Optical connectors can be used to couple the optical fibers to each of system 110 and 120A-120I. In some examples, one or more of systems 120A-120I include steering mechanisms but no light sources, transmitters, or light detectors. A steering mechanism may include one or more moveable mirrors such as one or more polygon mirrors, one or more single plane mirrors, one or more multi-plane mirrors, or the like. Embodiments of the light source, transmitter, steering mechanism, and light detector are described in more detail below. Via the steering mechanisms, one or more of systems 120A-120I scan light into one or more respective FOVs and receive corresponding return light. The return light is formed by scattering or reflecting the transmission light by one or more objects in the FOVs. Systems 120A-120I may also include collection lens and/or other optics to focus and/or direct the return light into optical fibers, which deliver the received return light to system 110. System 110 includes one or more light detectors for detecting the received return light. In some examples, system 110 is disposed inside a vehicle such that it is in a temperature-controlled environment, while one or more systems 120A-120I may be at least partially exposed to the external environment.

Figure 2:
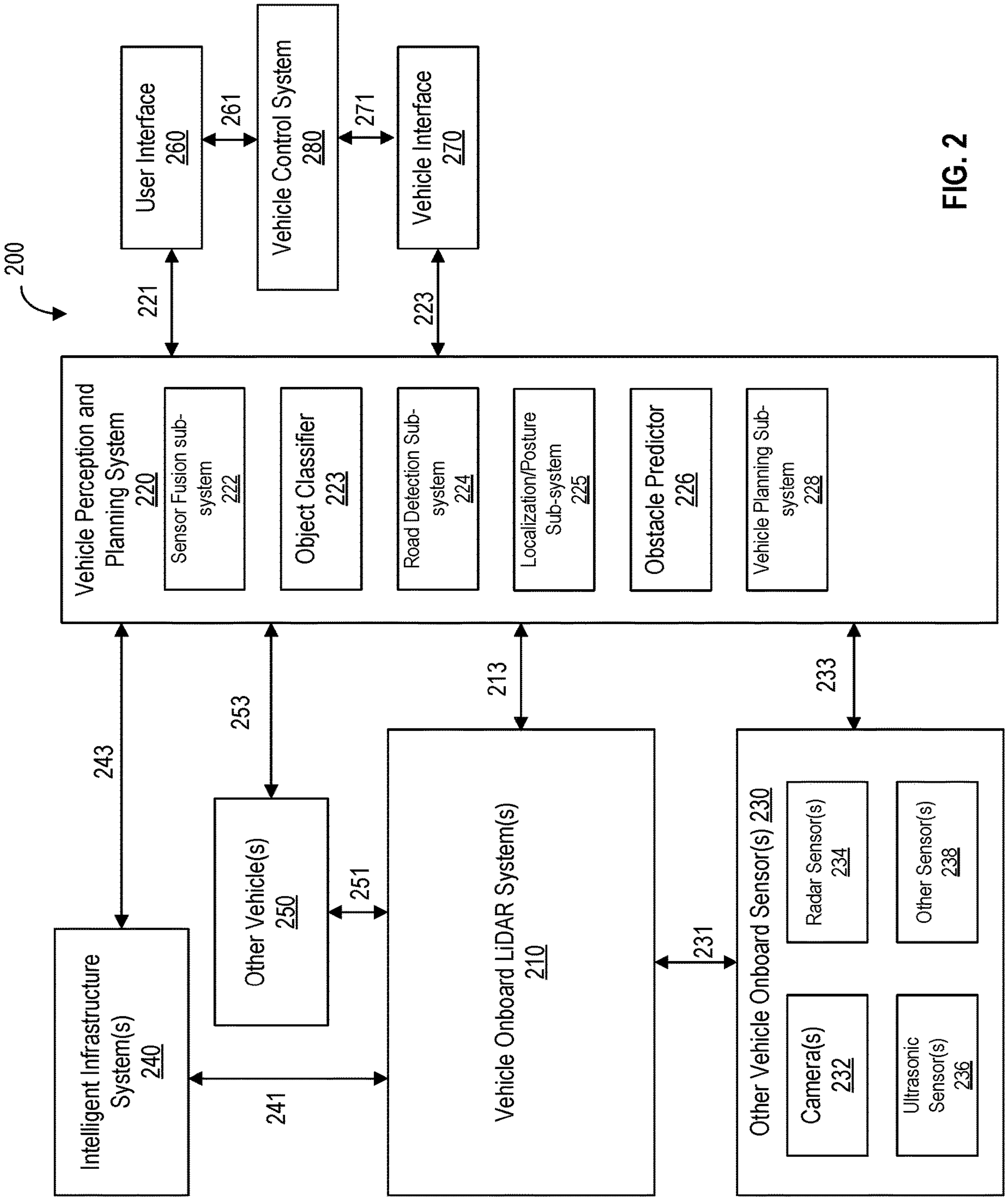
FIG. 2 is a block diagram illustrating interactions between an example LiDAR system and multiple other systems including a vehicle perception and planning system.

FIG. 2 is a block diagram 200 illustrating interactions between vehicle onboard LiDAR system(s) 210 and multiple other systems including a vehicle perception and planning system 220. LiDAR system(s) 210 can be mounted on or integrated to a vehicle. LiDAR system(s) 210 include sensor(s) that scan laser light to the surrounding environment to measure the distance, angle, and/or velocity of objects. Based on the scattered light that returned to LiDAR system(s) 210, it can generate sensor data (e.g., image data or 3D point cloud data) representing the perceived external environment.

LiDAR system(s) 210 can include one or more of short-range LiDAR sensors, medium-range LiDAR sensors, and long-range LiDAR sensors. A short-range LiDAR sensor measures objects located up to about 20-50 meters from the LiDAR sensor. Short-range LiDAR sensors can be used for, e.g., monitoring nearby moving objects (e.g., pedestrians crossing street in a school zone), parking assistance applications, or the like. A medium-range LiDAR sensor measures objects located up to about 70-200 meters from the LiDAR sensor. Medium-range LiDAR sensors can be used for, e.g., monitoring road intersections, assistance for merging onto or leaving a freeway, or the like. A long-range LiDAR sensor measures objects located up to about 200 meters and beyond. Long-range LiDAR sensors are typically used when a vehicle is travelling at a high speed (e.g., on a freeway), such that the vehicle's control systems may only have a few seconds (e.g., 6-8 seconds) to respond to any situations detected by the LiDAR sensor. As shown in FIG. 2, in one embodiment, the LiDAR sensor data can be provided to vehicle perception and planning system 220 via a communication path 213 for further processing and controlling the vehicle operations. Communication path 213 can be any wired or wireless communication links that can transfer data.

With reference still to FIG. 2, in some embodiments, other vehicle onboard sensor(s) 230 are configured to provide additional sensor data separately or together with LiDAR system(s) 210. Other vehicle onboard sensors 230 may include, for example, one or more camera(s) 232, one or more radar(s) 234, one or more ultrasonic sensor(s) 236, and/or other sensor(s) 238. Camera(s) 232 can take images and/or videos of the external environment of a vehicle. Camera(s) 232 can take, for example, high-definition (HD) videos having millions of pixels in each frame. A camera includes image sensors that facilitates producing monochrome or color images and videos. Color information may be important in interpreting data for some situations (e.g., interpreting images of traffic lights). Color information may not be available from other sensors such as LiDAR or radar sensors. Camera(s) 232 can include one or more of narrow-focus cameras, wider-focus cameras, side-facing cameras, infrared cameras, fisheye cameras, or the like. The image and/or video data generated by camera(s) 232 can also be provided to vehicle perception and planning system 220 via communication path 233 for further processing and controlling the vehicle operations. Communication path 233 can be any wired or wireless communication links that can transfer data. Camera(s) 232 can be mount on, or integrated to, a vehicle at any locations (e.g., rear-view mirrors, pillars, front grille, and/or back bumpers, etc.).

Other vehicle onboard sensos(s) 230 can also include radar sensor(s) 234. Radar sensor(s) 234 use radio waves to determine the range, angle, and velocity of objects. Radar sensor(s) 234 produce electromagnetic waves in the radio or microwave spectrum. The electromagnetic waves reflect off an object and some of the reflected waves return to the radar sensor, thereby providing information about the object's position and velocity. Radar sensor(s) 234 can include one or more of short-range radar(s), medium-range radar(s), and long-range radar(s). A short-range radar measures objects located at about 0.1-30 meters from the radar. A short-range radar is useful in detecting objects located nearby the vehicle, such as other vehicles, buildings, walls, pedestrians, bicyclists, etc. A short-range radar can be used to detect a blind spot, assist in lane changing, provide rear-end collision warning, assist in parking, provide emergency braking, or the like. A medium-range radar measures objects located at about 30-80 meters from the radar. A long-range radar measures objects located at about 80-200 meters. Medium- and/or long-range radars can be useful in, for example, traffic following, adaptive cruise control, and/or highway automatic braking. Sensor data generated by radar sensor(s) 234 can also be provided to vehicle perception and planning system 220 via communication path 233 for further processing and controlling the vehicle operations. Radar sensor(s) 234 can be mounted on, or integrated to, a vehicle at any location (e.g., rear-view mirrors, pillars, front grille, and/or back bumpers, etc.).

Other vehicle onboard sensor(s) 230 can also include ultrasonic sensor(s) 236. Ultrasonic sensor(s) 236 use acoustic waves or pulses to measure object located external to a vehicle. The acoustic waves generated by ultrasonic sensor(s) 236 are transmitted to the surrounding environment. At least some of the transmitted waves are reflected off an object and return to the ultrasonic sensor(s) 236. Based on the return signals, a distance of the object can be calculated. Ultrasonic sensor(s) 236 can be useful in, for example, checking blind spots, identifying parking spaces, providing lane changing assistance into traffic, or the like. Sensor data generated by ultrasonic sensor(s) 236 can also be provided to vehicle perception and planning system 220 via communication path 233 for further processing and controlling the vehicle operations. Ultrasonic sensor(s) 236 can be mount on, or integrated to, a vehicle at any locations (e.g., rear-view mirrors, pillars, front grille, and/or back bumpers, etc.).

In some embodiments, one or more other sensor(s) 238 may be attached in a vehicle and may also generate sensor data. Other sensor(s) 238 may include, for example, global positioning systems (GPS), inertial measurement units (IMU), or the like. Sensor data generated by other sensor(s) 238 can also be provided to vehicle perception and planning system 220 via communication path 233 for further processing and controlling the vehicle operations. It is understood that communication path 233 may include one or more communication links to transfer data between the various sensor(s) 230 and vehicle perception and planning system 220.

In some embodiments, as shown in FIG. 2, sensor data from other vehicle onboard sensor(s) 230 can be provided to vehicle onboard LiDAR system(s) 210 via communication path 231. LiDAR system(s) 210 may process the sensor data from other vehicle onboard sensor(s) 230. For example, sensor data from camera(s) 232, radar sensor(s) 234, ultrasonic sensor(s) 236, and/or other sensor(s) 238 may be correlated or fused with sensor data LiDAR system(s) 210, thereby at least partially offloading the sensor fusion process performed by vehicle perception and planning system 220.

It is understood that other configurations may also be implemented for transmitting and processing sensor data from the various sensors (e.g., data can be transmitted to a cloud or edge computing service provider for processing and then the processing results can be transmitted back to the vehicle perception and planning system 220 and/or LiDAR system 210).

With reference still to FIG. 2, in some embodiments, sensors onboard other vehicle(s) 250 are used to provide additional sensor data separately or together with LiDAR system(s) 210. For example, two or more nearby vehicles may have their own respective LiDAR sensor(s), camera(s), radar sensor(s), ultrasonic sensor(s), etc. Nearby vehicles can communicate and share sensor data with one another. Communications between vehicles are also referred to as V2V (vehicle to vehicle) communications. For example, as shown in FIG. 2, sensor data generated by other vehicle(s) 250 can be communicated to vehicle perception and planning system 220 and/or vehicle onboard LiDAR system(s) 210, via communication path 253 and/or communication path 251, respectively. Communication paths 253 and 251 can be any wired or wireless communication links that can transfer data.

Sharing sensor data facilitates a better perception of the environment external to the vehicles. For instance, a first vehicle may not sense a pedestrian that is behind a second vehicle but is approaching the first vehicle. The second vehicle may share the sensor data related to this pedestrian with the first vehicle such that the first vehicle can have additional reaction time to avoid collision with the pedestrian. In some embodiments, similar to data generated by sensor(s) 230, data generated by sensors onboard other vehicle(s) 250 may be correlated or fused with sensor data generated by LiDAR system(s) 210 (or with other LiDAR systems located in other vehicles), thereby at least partially offloading the sensor fusion process performed by vehicle perception and planning system 220.

In some embodiments, intelligent infrastructure system(s) 240 are used to provide sensor data separately or together with LiDAR system(s) 210. Certain infrastructures may be configured to communicate with a vehicle to convey information and vice versa. Communications between a vehicle and infrastructures are generally referred to as V2I (vehicle to infrastructure) communications. For example, intelligent infrastructure system(s) 240 may include an intelligent traffic light that can convey its status to an approaching vehicle in a message such as "changing to yellow in 5 seconds." Intelligent infrastructure system(s) 240 may also include its own LiDAR system mounted near an intersection such that it can convey traffic monitoring information to a vehicle. For example, a left-turning vehicle at an intersection may not have sufficient sensing capabilities because some of its own sensors may be blocked by traffic in the opposite direction. In such a situation, sensors of intelligent infrastructure system(s) 240 can provide useful data to the left-turning vehicle. Such data may include, for example, traffic conditions, information of objects in the direction the vehicle is turning to, traffic light status and predictions, or the like. These sensor data generated by intelligent infrastructure system(s) 240 can be provided to vehicle perception and planning system 220 and/or vehicle onboard LiDAR system(s) 210, via communication paths 243 and/or 241, respectively. Communication paths 243 and/or 241 can include any wired or wireless communication links that can transfer data. For example, sensor data from intelligent infrastructure system(s) 240 may be transmitted to LiDAR system(s) 210 and correlated or fused with sensor data generated by LiDAR system(s) 210, thereby at least partially offloading the sensor fusion process performed by vehicle perception and planning system 220. V2V and V2I communications described above are examples of vehicle-to-X (V2X) communications, where the "X" represents any other devices, systems, sensors, infrastructure, or the like that can share data with a vehicle.

With reference still to FIG. 2, via various communication paths, vehicle perception and planning system 220 receives sensor data from one or more of LiDAR system(s) 210, other vehicle onboard sensor(s) 230, other vehicle(s) 250, and/or intelligent infrastructure system(s) 240. In some embodiments, different types of sensor data are correlated and/or integrated by a sensor fusion sub-system 222. For example, sensor fusion sub-system 222 can generate a 360-degree model using multiple images or videos captured by multiple cameras disposed at different positions of the vehicle. Sensor fusion sub-system 222 obtains sensor data from different types of sensors and uses the combined data to perceive the environment more accurately. For example, a vehicle onboard camera 232 may not capture a clear image because it is facing the sun or a light source (e.g., another vehicle's headlight during nighttime) directly. A LiDAR system 210 may not be affected as much and therefore sensor fusion sub-system 222 can combine sensor data provided by both camera 232 and LiDAR system 210, and use the sensor data provided by LiDAR system 210 to compensate the unclear image captured by camera 232. As another example, in rainy or foggy weather, a radar sensor 234 may work better than a camera 232 or a LiDAR system 210. Accordingly, sensor fusion sub-system 222 may use sensor data provided by the radar sensor 234 to compensate the sensor data provided by camera 232 or LiDAR system 210.

In other examples, sensor data generated by other vehicle onboard sensor(s) 230 may have a lower resolution (e.g., radar sensor data) and thus may need to be correlated and confirmed by LiDAR system(s) 210, which usually has a higher resolution. For example, a sewage cover (also referred to as a manhole cover) may be detected by radar sensor 234 as an object towards which a vehicle is approaching. Due to the low-resolution nature of radar sensor 234, vehicle perception and planning system 220 may not be able to determine whether the object is an obstacle that the vehicle needs to avoid. High-resolution sensor data generated by LiDAR system(s) 210 thus can be used to correlated and confirm that the object is a sewage cover and causes no harm to the vehicle.

Vehicle perception and planning system 220 further comprises an object classifier 223. Using raw sensor data and/or correlated/fused data provided by sensor fusion sub-system 222, object classifier 223 can use any computer vision techniques to detect and classify the objects and estimate the positions of the objects. In some embodiments, object classifier 223 can use machine-learning based techniques to detect and classify objects. Examples of the machine-learning based techniques include utilizing algorithms such as region-based convolutional neural networks (R-CNN), Fast R-CNN, Faster R-CNN, histogram of oriented gradients (HOG), region-based fully convolutional network (R-FCN), single shot detector (SSD), spatial pyramid pooling (SPP-net), and/or You Only Look Once (Yolo).

Vehicle perception and planning system 220 further comprises a road detection sub-system 224. Road detection sub-system 224 localizes the road and identifies objects and/or markings on the road. For example, based on raw or fused sensor data provided by radar sensor(s) 234, camera(s) 232, and/or LiDAR system(s) 210, road detection subsystem 224 can build a 3D model of the road based on machine-learning techniques (e.g., pattern recognition algorithms for identifying lanes). Using the 3D model of the road, road detection sub-system 224 can identify objects (e.g., obstacles or debris on the road) and/or markings on the road (e.g., lane lines, turning marks, crosswalk marks, or the like).

Vehicle perception and planning system 220 further comprises a localization and vehicle posture sub-system 225. Based on raw or fused sensor data, localization and vehicle posture sub-system 225 can determine position of the vehicle and the vehicle's posture. For example, using sensor data from LiDAR system(s) 210, camera(s) 232, and/or GPS data, localization and vehicle posture sub-system 225 can determine an accurate position of the vehicle on the road and the vehicle's six degrees of freedom (e.g., whether the vehicle is moving forward or backward, up or down, and left or right). In some embodiments, high-definition (HD) maps are used for vehicle localization. HD maps can provide highly detailed, three-dimensional, computerized maps that pinpoint a vehicle's location. For instance, using the HD maps, localization and vehicle posture sub-system 225 can determine precisely the vehicle's current position (e.g., which lane of the road the vehicle is currently in, how close it is to a curb or a sidewalk) and predict vehicle's future positions.

Vehicle perception and planning system 220 further comprises obstacle predictor 226. Objects identified by object classifier 223 can be stationary (e.g., a light pole, a road sign) or dynamic (e.g., a moving pedestrian, bicycle, another car). For moving objects, predicting their moving path or future positions can be important to avoid collision. Obstacle predictor 226 can predict an obstacle trajectory and/or warn the driver or the vehicle planning sub-system 228 about a potential collision. For example, if there is a high likelihood that the obstacle's trajectory intersects with the vehicle's current moving path, obstacle predictor 226 can generate such a warning. Obstacle predictor 226 can use a variety of techniques for making such a prediction. Such techniques include, for example, constant velocity or acceleration models, constant turn rate and velocity/acceleration models, Kalman Filter and Extended Kalman Filter based models, recurrent neural network (RNN) based models, long short-term memory (LSTM) neural network based models, encoder-decoder RNN models, or the like.

With reference still to FIG. 2, in some embodiments, vehicle perception and planning system 220 further comprises vehicle planning sub-system 228. Vehicle planning sub-system 228 can include one or more planners such as a route planner, a driving behaviors planner, and a motion planner. The route planner can plan the route of a vehicle based on the vehicle's current location data, target location data, traffic information, etc. The driving behavior planner adjusts the timing and planned movement based on how other objects might move, using the obstacle prediction results provided by obstacle predictor 226. The motion planner determines the specific operations the vehicle needs to follow. The planning results are then communicated to vehicle control system 280 via vehicle interface 270. The communication can be performed through communication paths 223 and 271, which include any wired or wireless communication links that can transfer data.

Vehicle control system 280 controls the vehicle's steering mechanism, throttle, brake, etc., to operate the vehicle according to the planned route and movement. In some examples, vehicle perception and planning system 220 may further comprise a user interface 260, which provides a user (e.g., a driver) access to vehicle control system 280 to, for example, override or take over control of the vehicle when necessary. User interface 260 may also be separate from vehicle perception and planning system 220. User interface 260 can communicate with vehicle perception and planning system 220, for example, to obtain and display raw or fused sensor data, identified objects, vehicle's location/posture, etc. These displayed data can help a user to better operate the vehicle. User interface 260 can communicate with vehicle perception and planning system 220 and/or vehicle control system 280 via communication paths 221 and 261 respectively, which include any wired or wireless communication links that can transfer data. It is understood that the various systems, sensors, communication links, and interfaces in FIG. 2 can be configured in any desired manner and not limited to the configuration shown in FIG. 2.

Figure 3:
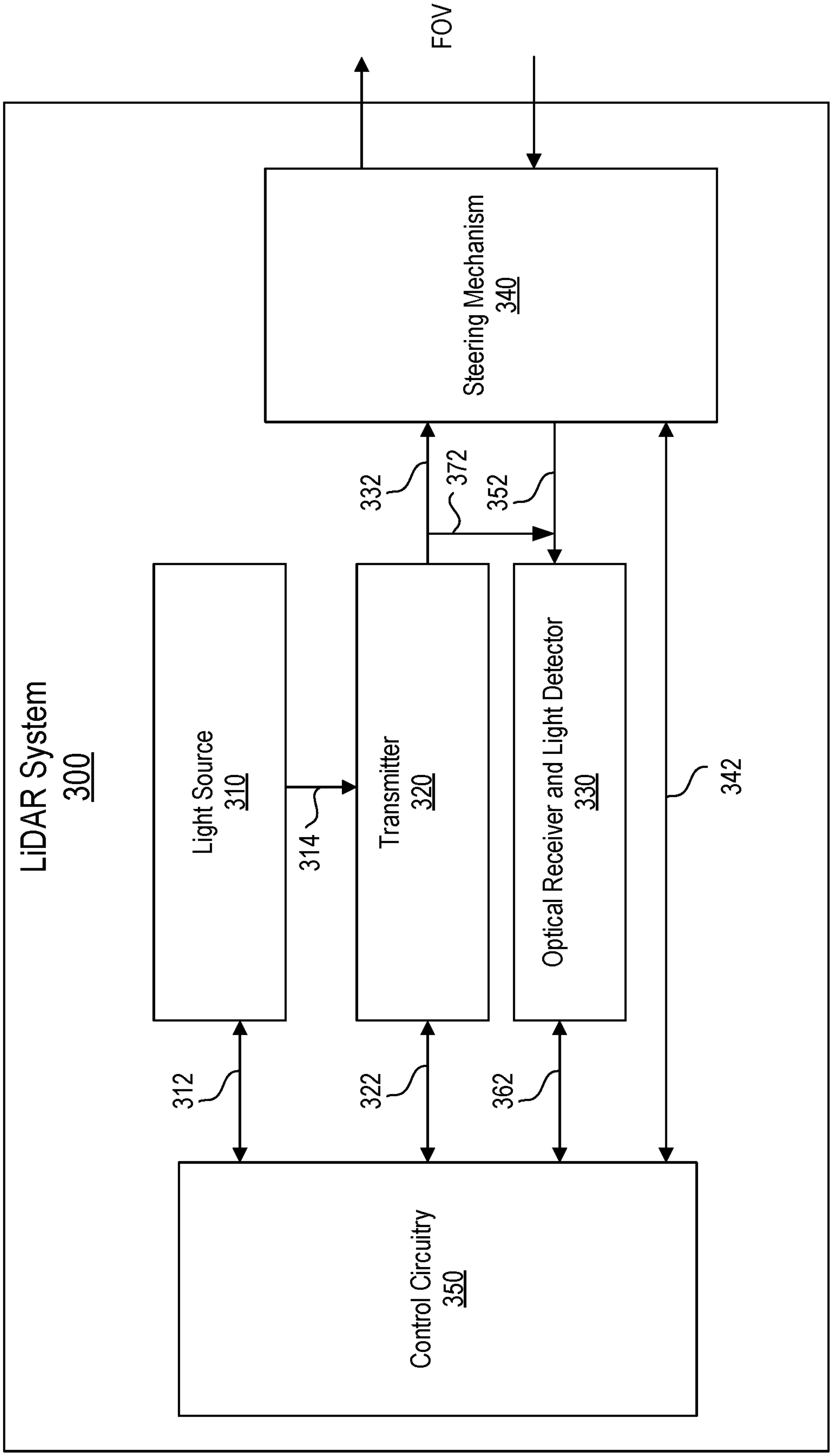
FIG. 3 is a block diagram illustrating an example LiDAR system.

FIG. 3 is a block diagram illustrating an example LiDAR system 300. LiDAR system 300 can be used to implement LiDAR systems 110, 120A-120I, and/or 210 shown in FIGS. 1 and 2. In one embodiment, LiDAR system 300 comprises a light source 310, a transmitter 320, an optical receiver and light detector 330, a steering system 340, and a control circuitry 350. These components are coupled together using communications paths 312, 314, 322, 332, 342, 352, and 362. These communications paths include communication links (wired or wireless, bidirectional or unidirectional) among the various LiDAR system components, but need not be physical components themselves. While the communications paths can be implemented by one or more electrical wires, buses, or optical fibers, the communication paths can also be wireless channels or free-space optical paths so that no physical communication medium is present. For example, in one embodiment of LiDAR system 300, communication path 314 between light source 310 and transmitter 320 may be implemented using one or more optical fibers. Communication paths 332 and 352 may represent optical paths implemented using free space optical components and/or optical fibers. And communication paths 312, 322, 342, and 362 may be implemented using one or more electrical wires that carry electrical signals. The communications paths can also include one or more of the above types of communication mediums (e.g., they can include an optical fiber and a free-space optical component, or include one or more optical fibers and one or more electrical wires).

In some embodiments, LiDAR system 300 can be a coherent LiDAR system. One example is a frequency-modulated continuous-wave (FMCW) LiDAR. Coherent LiDARs detect objects by mixing return light from the objects with light from the coherent laser transmitter. Thus, as shown in FIG. 3, if LiDAR system 300 is a coherent LiDAR, it may include a route 372 providing a portion of transmission light from transmitter 320 to optical receiver and light detector 330. The transmission light provided by transmitter 320 may be modulated light and can be split into two portions. One portion is transmitted to the FOV, while the second portion is sent to the optical receiver and light detector of the LiDAR system. The second portion is also referred to as the light that is kept local (LO) to the LiDAR system. The transmission light is scattered or reflected by various objects in the FOV and at least a portion of it forms return light. The return light is subsequently detected and interferometrically recombined with the second portion of the transmission light that was kept local. Coherent LiDAR provides a means of optically sensing an object's range as well as its relative velocity along the line-of-sight (LOS).

LiDAR system 300 can also include other components not depicted in FIG. 3, such as power buses, power supplies, LED indicators, switches, etc. Additionally, other communication connections among components may be present, such as a direct connection between light source 310 and optical receiver and light detector 330 to provide a reference signal so that the time from when a light pulse is transmitted until a return light pulse is detected can be accurately measured.

Light source 310 outputs laser light for illuminating objects in a field of view (FOV). The laser light can be infrared light having a wavelength in the range of 700 nm to 1 mm. Light source 310 can be, for example, a semiconductor-based laser (e.g., a diode laser) and/or a fiber-based laser. A semiconductor-based laser can be, for example, an edge emitting laser (EEL), a vertical cavity surface emitting laser (VCSEL), an external-cavity diode laser, a vertical-external-cavity surface-emitting laser, a distributed feedback (DFB) laser, a distributed Bragg reflector (DBR) laser, an interband cascade laser, a quantum cascade laser, a quantum well laser, a double heterostructure laser, or the like. A fiber-based laser is a laser in which the active gain medium is an optical fiber doped with rare-earth elements such as erbium, ytterbium, neodymium, dysprosium, praseodymium, thulium and/or holmium. In some embodiments, a fiber laser is based on double-clad fibers, in which the gain medium forms the core of the fiber surrounded by two layers of cladding. The double-clad fiber allows the core to be pumped with a high-power beam, thereby enabling the laser source to be a high power fiber laser source.

In some embodiments, light source 310 comprises a master oscillator (also referred to as a seed laser) and power amplifier (MOPA). The power amplifier amplifies the output power of the seed laser. The power amplifier can be a fiber amplifier, a bulk amplifier, or a semiconductor optical amplifier. The seed laser can be a diode laser (e.g., a Fabry-Perot cavity laser, a distributed feedback laser), a solid-state bulk laser, or a tunable external-cavity diode laser. In some embodiments, light source 310 can be an optically pumped microchip laser. Microchip lasers are alignment-free monolithic solid-state lasers where the laser crystal is directly contacted with the end mirrors of the laser resonator. A microchip laser is typically pumped with a laser diode (directly or using a fiber) to obtain the desired output power. A microchip laser can be based on neodymium-doped yttrium aluminum garnet ($Y_3Al_5O_{12}$) laser crystals (i.e., Nd:YAG), or neodymium-doped vanadate (i.e., ND:$YVO_4$) laser crystals. In some examples, light source 310 may have multiple amplification stages to achieve a high power gain such that the laser output can have high power, thereby enabling the LiDAR system to have a long scanning range. In some examples, the power amplifier of light source 310 can be controlled such that the power gain can be varied to achieve any desired laser output power.

Figure 4:
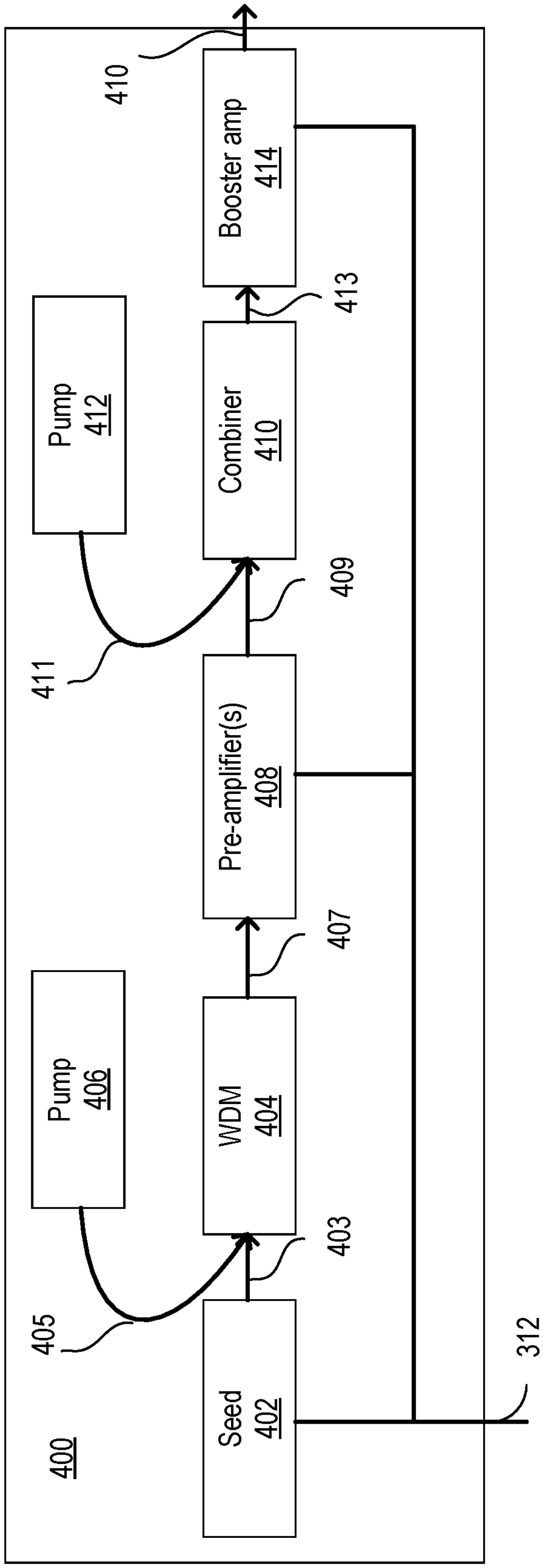
FIG. 4 is a block diagram illustrating an example fiber-based laser source.

FIG. 4 is a block diagram illustrating an example fiber-based laser source 400 having a seed laser and one or more pumps (e.g., laser diodes) for pumping desired output power. Fiber-based laser source 400 is an example of light source 310 depicted in FIG. 3. In some embodiments, fiber-based laser source 400 comprises a seed laser 402 to generate initial light pulses of one or more wavelengths (e.g., infrared wavelengths such as 1550 nm), which are provided to a wavelength-division multiplexor (WDM) 404 via an optical fiber 403. Fiber-based laser source 400 further comprises a pump 406 for providing laser power (e.g., of a different wavelength, such as 980 nm) to WDM 404 via an optical fiber 405. WDM 404 multiplexes the light pulses provided by seed laser 402 and the laser power provided by pump 406 onto a single optical fiber 407. The output of WDM 404 can then be provided to one or more pre-amplifier(s) 408 via optical fiber 407. Pre-amplifier(s) 408 can be optical amplifier(s) that amplify optical signals (e.g., with about 10-30 dB gain). In some embodiments, pre-amplifier(s) 408 are low noise amplifiers. Pre-amplifier(s) 408 output to an optical combiner 410 via an optical fiber 409. Combiner 410 combines the output laser light of pre-amplifier(s) 408 with the laser power provided by pump 412 via an optical fiber 411. Combiner 410 can combine optical signals having the same wavelength or different wavelengths. One example of a combiner is a WDM. Combiner 410 provides combined optical signals to a booster amplifier 414, which produces output light pulses via optical fiber 410. The booster amplifier 414 provides further amplification of the optical signals (e.g., another 20-40 dB). The outputted light pulses can then be transmitted to transmitter 320 and/or steering mechanism 340 (shown in FIG. 3). It is understood that FIG. 4 illustrates one example configuration of fiber-based laser source 400. Laser source 400 can have many other configurations using different combinations of one or more components shown in FIG. 4 and/or other components not shown in FIG. 4 (e.g., other components such as power supplies, lens(es), filters, splitters, combiners, etc.).

In some variations, fiber-based laser source 400 can be controlled (e.g., by control circuitry 350) to produce pulses of different amplitudes based on the fiber gain profile of the fiber used in fiber-based laser source 400. Communication path 312 couples fiber-based laser source 400 to control circuitry 350 (shown in FIG. 3) so that components of fiber-based laser source 400 can be controlled by or otherwise communicate with control circuitry 350. Alternatively, fiber-based laser source 400 may include its own dedicated controller. Instead of control circuitry 350 communicating directly with components of fiber-based laser source 400, a dedicated controller of fiber-based laser source 400 communicates with control circuitry 350 and controls and/or communicates with the components of fiber-based laser source 400. Fiber-based laser source 400 can also include other components not shown, such as one or more power connectors, power supplies, and/or power lines.

Referencing FIG. 3, typical operating wavelengths of light source 310 comprise, for example, about 850 nm, about 905 nm, about 940 nm, about 1064 nm, and about 1550 nm. For laser safety, the upper limit of maximum usable laser power is set by the U.S. FDA (U.S. Food and Drug Administration) regulations. The optical power limit at 1550 nm wavelength is much higher than those of the other aforementioned wavelengths. Further, at 1550 nm, the optical power loss in a fiber is low. There characteristics of the 1550 nm wavelength make it more beneficial for long-range LiDAR applications. The amount of optical power output from light source 310 can be characterized by its peak power, average power, pulse energy, and/or the pulse energy density. The peak power is the ratio of pulse energy to the width of the pulse (e.g., full width at half maximum or FWHM). Thus, a smaller pulse width can provide a larger peak power for a fixed amount of pulse energy. A pulse width can be in the range of nanosecond or picosecond. The average power is the product of the energy of the pulse and the pulse repetition rate (PRR). As described in more detail below, the PRR represents the frequency of the pulsed laser light. In general, the smaller the time interval between the pulses, the higher the PRR. The PRR typically corresponds to the maximum range that a LiDAR system can measure. Light source 310 can be configured to produce pulses at high PRR to meet the desired number of data points in a point cloud generated by the LiDAR system. Light source 310 can also be configured to produce pulses at medium or low PRR to meet the desired maximum detection distance. Wall plug efficiency (WPE) is another factor to evaluate the total power consumption, which may be a useful indicator in evaluating the laser efficiency. For example, as shown in FIG. 1, multiple LiDAR systems may be attached to a vehicle, which may be an electrical-powered vehicle or a vehicle otherwise having limited fuel or battery power supply. Therefore, high WPE and intelligent ways to use laser power are often among the important considerations when selecting and configuring light source 310 and/or designing laser delivery systems for vehicle-mounted LiDAR applications.

It is understood that the above descriptions provide non-limiting examples of a light source 310. Light source 310 can be configured to include many other types of light sources (e.g., laser diodes, short-cavity fiber lasers, solid-state lasers, and/or tunable external cavity diode lasers) that are configured to generate one or more light signals at various wavelengths. In some examples, light source 310 comprises amplifiers (e.g., pre-amplifiers and/or booster amplifiers), which can be a doped optical fiber amplifier, a solid-state bulk amplifier, and/or a semiconductor optical amplifier. The amplifiers are configured to receive and amplify light signals with desired gains.

With reference back to FIG. 3, LiDAR system 300 further comprises a transmitter 320. Light source 310 provides laser light (e.g., in the form of a laser beam) to transmitter 320. The laser light provided by light source 310 can be amplified laser light with a predetermined or controlled wavelength, pulse repetition rate, and/or power level. Transmitter 320 receives the laser light from light source 310 and transmits the laser light to steering mechanism 340 with low divergence. In some embodiments, transmitter 320 can include, for example, optical components (e.g., lens, fibers, mirrors, etc.) for transmitting one or more laser beams to a field-of-view (FOV) directly or via steering mechanism 340. While FIG. 3 illustrates transmitter 320 and steering mechanism 340 as separate components, they may be combined or integrated as one system in some embodiments. Steering mechanism 340 is described in more detail below.

Laser beams provided by light source 310 may diverge as they travel to transmitter 320. Therefore, transmitter 320 often comprises a collimating lens configured to collect the diverging laser beams and produce more parallel optical beams with reduced or minimum divergence. The collimated optical beams can then be further directed through various optics such as mirrors and lens. A collimating lens may be, for example, a single plano-convex lens or a lens group. The collimating lens can be configured to achieve any desired properties such as the beam diameter, divergence, numerical aperture, focal length, or the like. A beam propagation ratio or beam quality factor (also referred to as the M2 factor) is used for measurement of laser beam quality. In many LiDAR applications, it is important to have good laser beam quality in the generated transmitting laser beam. The M2 factor represents a degree of variation of a beam from an ideal Gaussian beam. Thus, the M2 factor reflects how well a collimated laser beam can be focused on a small spot, or how well a divergent laser beam can be collimated. Therefore, light source 310 and/or transmitter 320 can be configured to meet, for example, a scan resolution requirement while maintaining the desired M2 factor.

One or more of the light beams provided by transmitter 320 are scanned by steering mechanism 340 to a FOV. Steering mechanism 340 scans light beams in multiple dimensions (e.g., in both the horizontal and vertical dimension) to facilitate LiDAR system 300 to map the environment by generating a 3D point cloud. A horizontal dimension can be a dimension that is parallel to the horizon or a surface associated with the LiDAR system or a vehicle (e.g., a road surface). A vertical dimension is perpendicular to the horizontal dimension (i.e., the vertical dimension forms a 90-degree angle with the horizontal dimension). Steering mechanism 340 will be described in more detail below. The laser light scanned to an FOV may be scattered or reflected by an object in the FOV. At least a portion of the scattered or reflected light forms return light that returns to LiDAR system 300. FIG. 3 further illustrates an optical receiver and light detector 330 configured to receive the return light. Optical receiver and light detector 330 comprises an optical receiver that is configured to collect the return light from the FOV. The optical receiver can include optics (e.g., lens, fibers, mirrors, etc.) for receiving, redirecting, focusing, amplifying, and/or filtering return light from the FOV. For example, the optical receiver often includes a collection lens (e.g., a single plano-convex lens or a lens group) to collect and/or focus the collected return light onto a light detector.

A light detector detects the return light focused by the optical receiver and generates current and/or voltage signals proportional to the incident intensity of the return light. Based on such current and/or voltage signals, the depth information of the object in the FOV can be derived. One example method for deriving such depth information is based on the direct TOF (time of flight), which is described in more detail below. A light detector may be characterized by its detection sensitivity, quantum efficiency, detector bandwidth, linearity, signal to noise ratio (SNR), overload resistance, interference immunity, etc. Based on the applications, the light detector can be configured or customized to have any desired characteristics. For example, optical receiver and light detector 330 can be configured such that the light detector has a large dynamic range while having a good linearity. The light detector linearity indicates the detector's capability of maintaining linear relationship between input optical signal power and the detector's output. A detector having good linearity can maintain a linear relationship over a large dynamic input optical signal range.

To achieve desired detector characteristics, configurations or customizations can be made to the light detector's structure and/or the detector's material system. Various detector structure can be used for a light detector. For example, a light detector structure can be a PIN based structure, which has an undoped intrinsic semiconductor region (i.e., an "i" region) between a p-type semiconductor and an n-type semiconductor region. Other light detector structures comprise, for example, an APD (avalanche photodiode) based structure, a PMT (photomultiplier tube) based structure, a SiPM (Silicon photomultiplier) based structure, a SPAD (single-photon avalanche diode) based structure, and/or quantum wires. For material systems used in a light detector, Si, InGaAs, and/or Si/Ge based materials can be used. It is understood that many other detector structures and/or material systems can be used in optical receiver and light detector 330.

A light detector (e.g., an APD based detector) may have an internal gain such that the input signal is amplified when generating an output signal. However, noise may also be amplified due to the light detector's internal gain. Common types of noise include signal shot noise, dark current shot noise, thermal noise, and amplifier noise. In some embodiments, optical receiver and light detector 330 may include a pre-amplifier that is a low noise amplifier (LNA). In some embodiments, the pre-amplifier may also include a transimpedance amplifier (TIA), which converts a current signal to a voltage signal. For a linear detector system, input equivalent noise or noise equivalent power (NEP) measures how sensitive the light detector is to weak signals. Therefore, they can be used as indicators of the overall system performance. For example, the NEP of a light detector specifies the power of the weakest signal that can be detected and therefore it in turn specifies the maximum range of a LiDAR system. It is understood that various light detector optimization techniques can be used to meet the requirement of LiDAR system 300. Such optimization techniques may include selecting different detector structures, materials, and/or implementing signal processing techniques (e.g., filtering, noise reduction, amplification, or the like). For example, in addition to, or instead of, using direct detection of return signals (e.g., by using ToF), coherent detection can also be used for a light detector. Coherent detection allows for detecting amplitude and phase information of the received light by interfering the received light with a local oscillator. Coherent detection can improve detection sensitivity and noise immunity.

FIG. 3 further illustrates that LiDAR system 300 comprises steering mechanism 340. As described above, steering mechanism 340 directs light beams from transmitter 320 to scan an FOV in multiple dimensions. A steering mechanism is referred to as a raster mechanism, a scanning mechanism, or simply a light scanner. Scanning light beams in multiple directions (e.g., in both the horizontal and vertical directions) facilitates a LiDAR system to map the environment by generating an image or a 3D point cloud. A steering mechanism can be based on mechanical scanning and/or solid-state scanning. Mechanical scanning uses rotating mirrors to steer the laser beam or physically rotate the LiDAR transmitter and receiver (collectively referred to as transceiver) to scan the laser beam. Solid-state scanning directs the laser beam to various positions through the FOV without mechanically moving any macroscopic components such as the transceiver. Solid-state scanning mechanisms include, for example, optical phased arrays based steering and flash LiDAR based steering. In some embodiments, because solid-state scanning mechanisms do not physically move macroscopic components, the steering performed by a solid-state scanning mechanism may be referred to as effective steering. A LiDAR system using solid-state scanning may also be referred to as a non-mechanical scanning or simply non-scanning LiDAR system (a flash LiDAR system is an example non-scanning LiDAR system).

Steering mechanism 340 can be used with a transceiver (e.g., transmitter 320 and optical receiver and light detector 330) to scan the FOV for generating an image or a 3D point cloud. As an example, to implement steering mechanism 340, a two-dimensional mechanical scanner can be used with a single-point or several single-point transceivers. A single-point transceiver transmits a single light beam or a small number of light beams (e.g., 2-8 beams) to the steering mechanism. A two-dimensional mechanical steering mechanism comprises, for example, polygon mirror(s), oscillating mirror(s), rotating prism(s), rotating tilt mirror surface(s), single-plane or multi-plane mirror(s), or a combination thereof. In some embodiments, steering mechanism 340 may include non-mechanical steering mechanism(s) such as solid-state steering mechanism(s). For example, steering mechanism 340 can be based on tuning wavelength of the laser light combined with refraction effect, and/or based on reconfigurable grating/phase array. In some embodiments, steering mechanism 340 can use a single scanning device to achieve two-dimensional scanning or multiple scanning devices combined to realize two-dimensional scanning.

As another example, to implement steering mechanism 340, a one-dimensional mechanical scanner can be used with an array or a large number of single-point transceivers. Specifically, the transceiver array can be mounted on a rotating platform to achieve 360-degree horizontal field of view. Alternatively, a static transceiver array can be combined with the one-dimensional mechanical scanner. A one-dimensional mechanical scanner comprises polygon mirror(s), oscillating mirror(s), rotating prism(s), rotating tilt mirror surface(s), or a combination thereof, for obtaining a forward-looking horizontal field of view. Steering mechanisms using mechanical scanners can provide robustness and reliability in high volume production for automotive applications.

As another example, to implement steering mechanism 340, a two-dimensional transceiver can be used to generate a scan image or a 3D point cloud directly. In some embodiments, a stitching or micro shift method can be used to improve the resolution of the scan image or the field of view being scanned. For example, using a two-dimensional transceiver, signals generated at one direction (e.g., the horizontal direction) and signals generated at the other direction (e.g., the vertical direction) may be integrated, interleaved, and/or matched to generate a higher or full resolution image or 3D point cloud representing the scanned FOV.

Some implementations of steering mechanism 340 comprise one or more optical redirection elements (e.g., mirrors or lenses) that steer return light signals (e.g., by rotating, vibrating, or directing) along a receive path to direct the return light signals to optical receiver and light detector 330. The optical redirection elements that direct light signals along the transmitting and receiving paths may be the same components (e.g., shared), separate components (e.g., dedicated), and/or a combination of shared and separate components. This means that in some cases the transmitting and receiving paths are different although they may partially overlap (or in some cases, substantially overlap or completely overlap).

With reference still to FIG. 3, LiDAR system 300 further comprises control circuitry 350. Control circuitry 350 can be configured and/or programmed to control various parts of the LiDAR system 300 and/or to perform signal processing. In a typical system, control circuitry 350 can be configured and/or programmed to perform one or more control operations including, for example, controlling light source 310 to obtain the desired laser pulse timing, the pulse repetition rate, and power; controlling steering mechanism 340 (e.g., controlling the speed, direction, and/or other parameters) to scan the FOV and maintain pixel registration and/or alignment; controlling optical receiver and light detector 330 (e.g., controlling the sensitivity, noise reduction, filtering, and/or other parameters) such that it is an optimal state; and monitoring overall system health/status for functional safety (e.g., monitoring the laser output power and/or the steering mechanism operating status for safety).

Control circuitry 350 can also be configured and/or programmed to perform signal processing to the raw data generated by optical receiver and light detector 330 to derive distance and reflectance information, and perform data packaging and communication to vehicle perception and planning system 220 (shown in FIG. 2). For example, control circuitry 350 determines the time it takes from transmitting a light pulse until a corresponding return light pulse is received; determines when a return light pulse is not received for a transmitted light pulse; determines the direction (e.g., horizontal and/or vertical information) for a transmitted/return light pulse; determines the estimated range in a particular direction; derives the reflectivity of an object in the FOV, and/or determines any other type of data relevant to LiDAR system 300.

LiDAR system 300 can be disposed in a vehicle, which may operate in many different environments including hot or cold weather, rough road conditions that may cause intense vibration, high or low humidities, dusty areas, etc. Therefore, in some embodiments, optical and/or electronic components of LiDAR system 300 (e.g., optics in transmitter 320, optical receiver and light detector 330, and steering mechanism 340) are disposed and/or configured in such a manner to maintain long term mechanical and optical stability. For example, components in LiDAR system 300 may be secured and sealed such that they can operate under all conditions a vehicle may encounter. As an example, an anti-moisture coating and/or hermetic sealing may be applied to optical components of transmitter 320, optical receiver and light detector 330, and steering mechanism 340 (and other components that are susceptible to moisture). As another example, housing(s), enclosure(s), fairing(s), and/or window can be used in LiDAR system 300 for providing desired characteristics such as hardness, ingress protection (IP) rating, self-cleaning capability, resistance to chemical and resistance to impact, or the like. In addition, efficient and economical methodologies for assembling LiDAR system 300 may be used to meet the LiDAR operating requirements while keeping the cost low.

It is understood by a person of ordinary skill in the art that FIG. 3 and the above descriptions are for illustrative purposes only, and a LiDAR system can include other functional units, blocks, or segments, and can include variations or combinations of these above functional units, blocks, or segments. For example, LiDAR system 300 can also include other components not depicted in FIG. 3, such as power buses, power supplies, LED indicators, switches, etc. Additionally, other connections among components may be present, such as a direct connection between light source 310 and optical receiver and light detector 330 so that light detector 330 can accurately measure the time from when light source 310 transmits a light pulse until light detector 330 detects a return light pulse.

These components shown in FIG. 3 are coupled together using communications paths 312, 314, 322, 332, 342, 352, and 362. These communications paths represent communication (bidirectional or unidirectional) among the various LiDAR system components but need not be physical components themselves. While the communications paths can be implemented by one or more electrical wires, busses, or optical fibers, the communication paths can also be wireless channels or open-air optical paths so that no physical communication medium is present. For example, in one example LiDAR system, communication path 314 includes one or more optical fibers; communication path 352 represents an optical path; and communication paths 312, 322, 342, and 362 are all electrical wires that carry electrical signals. The communication paths can also include more than one of the above types of communication mediums (e.g., they can include an optical fiber and an optical path, or one or more optical fibers and one or more electrical wires).

Figure 5A:
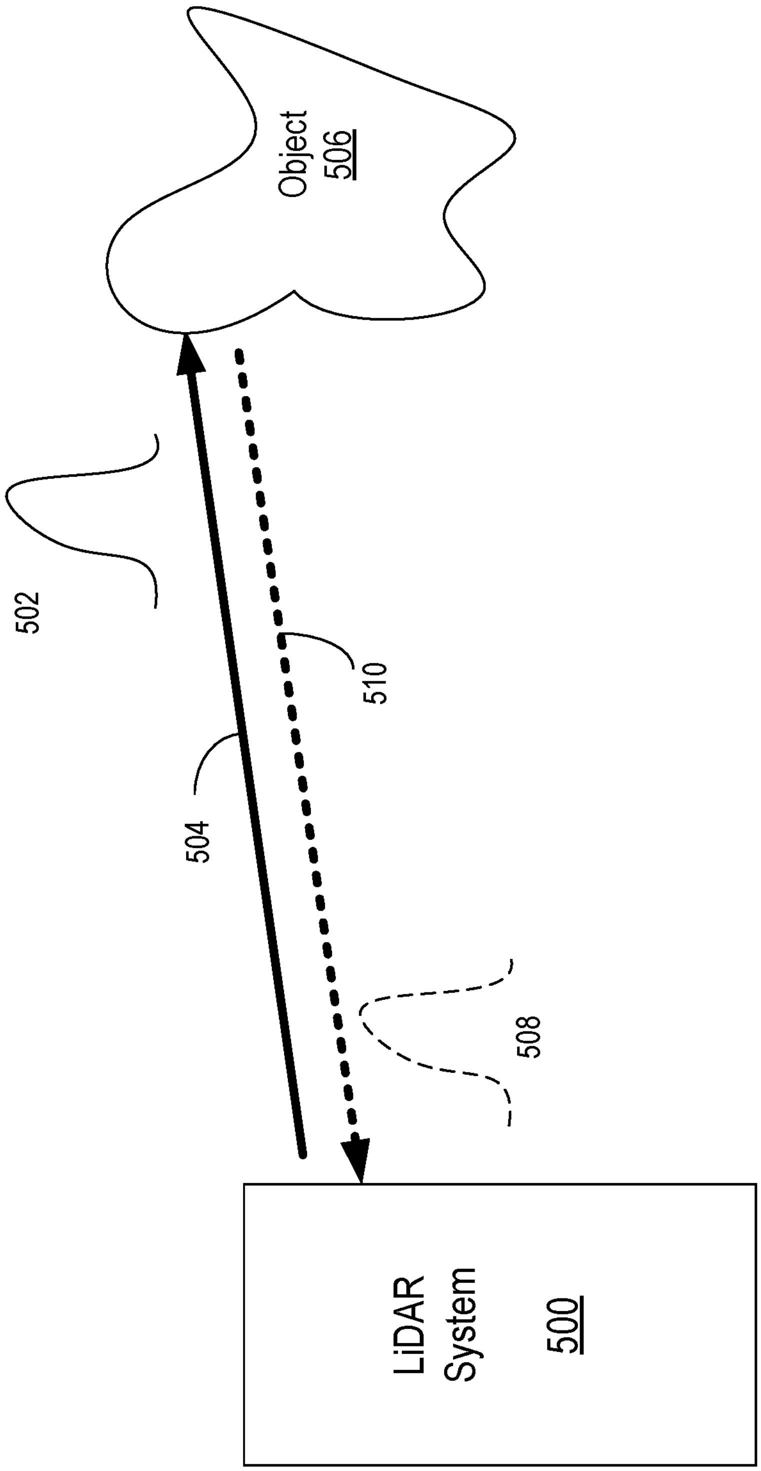
FIGS. 5A-5C illustrate an example LiDAR system using pulse signals to measure distances to objects disposed in a field-of-view (FOV).

As described above, some LiDAR systems use the time-of-flight (ToF) of light signals (e.g., light pulses) to determine the distance to objects in a light path. For example, with reference to FIG. 5A, an example LiDAR system 500 includes a laser light source (e.g., a fiber laser), a steering mechanism (e.g., a system of one or more moving mirrors), and a light detector (e.g., a photodetector with one or more optics). LiDAR system 500 can be implemented using, for example, LiDAR system 300 described above. LiDAR system 500 transmits a light pulse 502 along light path 504 as determined by the steering mechanism of LiDAR system 500. In the depicted example, light pulse 502, which is generated by the laser light source, is a short pulse of laser light. Further, the signal steering mechanism of the LiDAR system 500 is a pulsed-signal steering mechanism. However, it should be appreciated that LiDAR systems can operate by generating, transmitting, and detecting light signals that are not pulsed and derive ranges to an object in the surrounding environment using techniques other than time-of-flight. For example, some LiDAR systems use frequency modulated continuous waves (i.e., "FMCW"). It should be further appreciated that any of the techniques described herein with respect to time-of-flight based systems that use pulsed signals also may be applicable to LiDAR systems that do not use one or both of these techniques.

Referring back to FIG. 5A (e.g., illustrating a time-of-flight LiDAR system that uses light pulses), when light pulse 502 reaches object 506, light pulse 502 scatters or reflects to form a return light pulse 508. Return light pulse 508 may return to system 500 along light path 510. The time from when transmitted light pulse 502 leaves LiDAR system 500 to when return light pulse 508 arrives back at LiDAR system 500 can be measured (e.g., by a processor or other electronics, such as control circuitry 350, within the LiDAR system). This time-of-flight combined with the knowledge of the speed of light can be used to determine the range/distance from LiDAR system 500 to the portion of object 506 where light pulse 502 scattered or reflected.

Figure 5B:
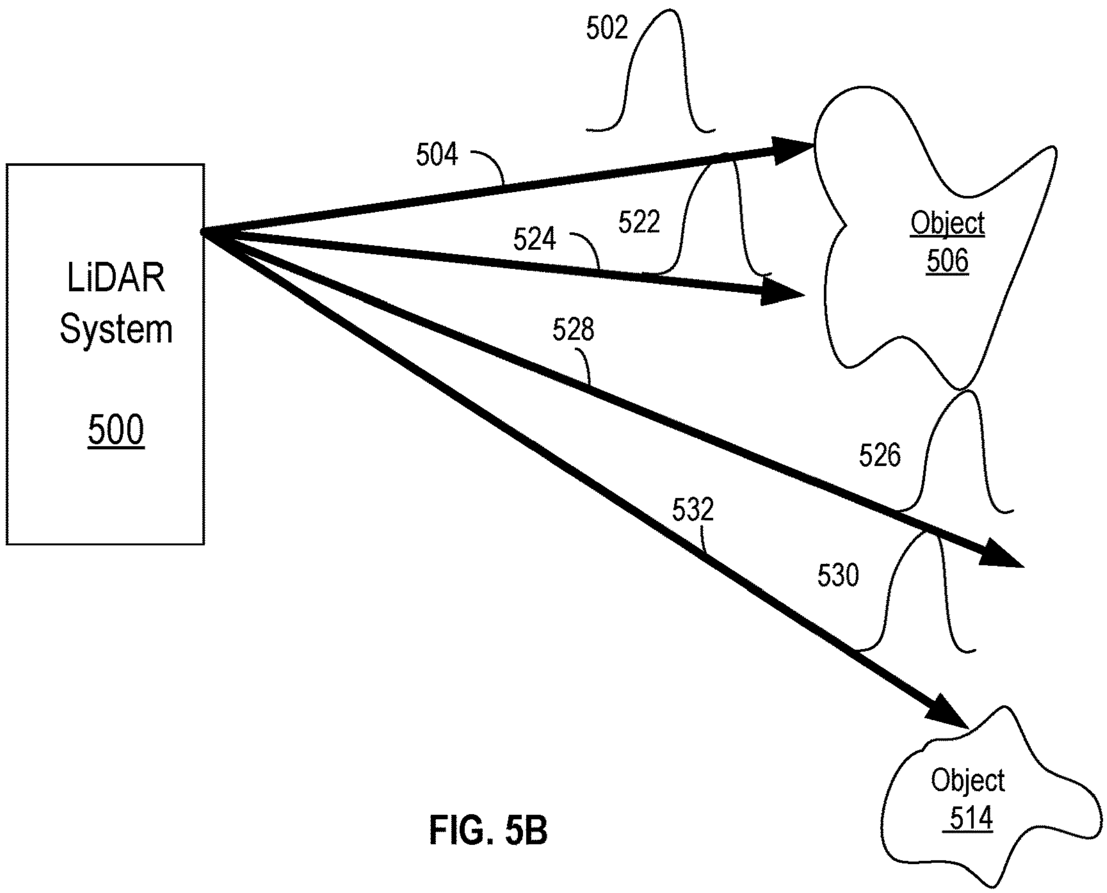
Figure 5C:
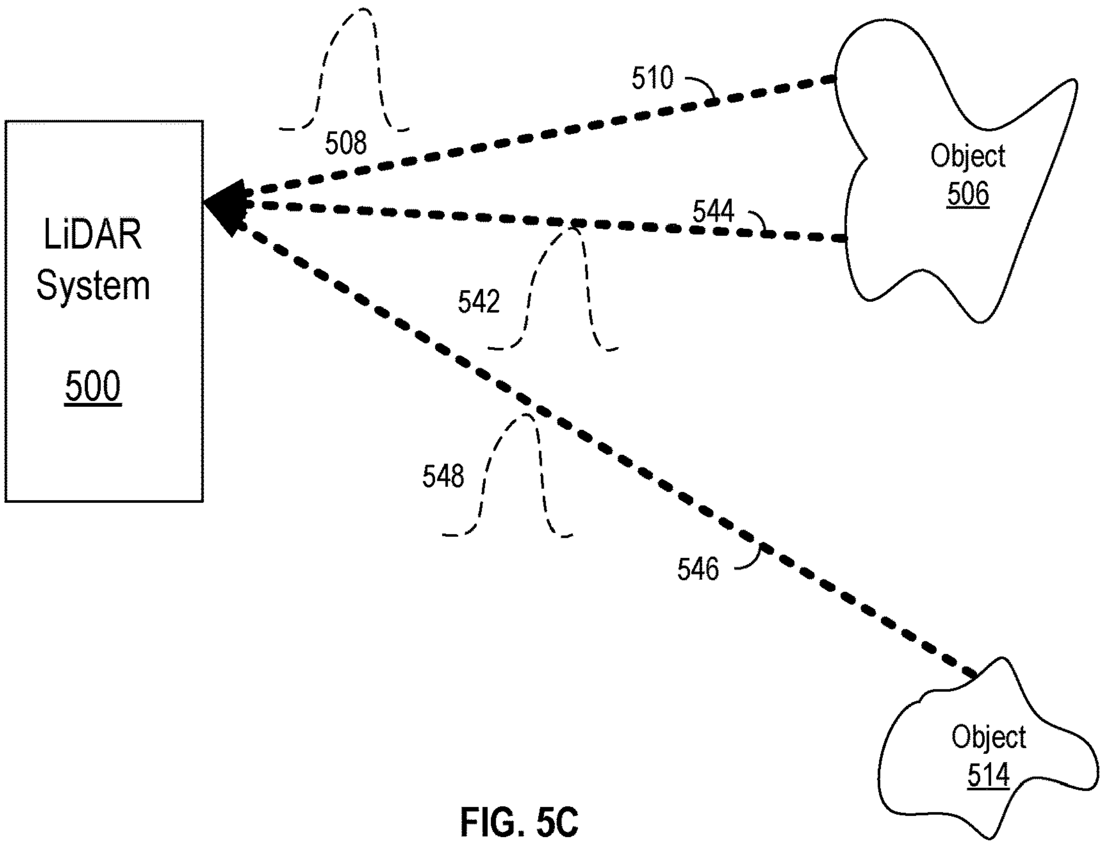

By directing many light pulses, as depicted in FIG. 5B, LiDAR system 500 scans the external environment (e.g., by directing light pulses 502, 522, 526, 530 along light paths 504, 524, 528, 532, respectively). As depicted in FIG. 5C, LiDAR system 500 receives return light pulses 508, 542, 548 (which correspond to transmitted light pulses 502, 522, 530, respectively). Return light pulses 508, 542, and 548 are formed by scattering or reflecting the transmitted light pulses by one of objects 506 and 514. Return light pulses 508, 542, and 548 may return to LiDAR system 500 along light paths 510, 544, and 546, respectively. Based on the direction of the transmitted light pulses (as determined by LiDAR system 500) as well as the calculated range from LiDAR system 500 to the portion of objects that scatter or reflect the light pulses (e.g., the portions of objects 506 and 514), the external environment within the detectable range (e.g., the field of view between path 504 and 532, inclusively) can be precisely mapped or plotted (e.g., by generating a 3D point cloud or images).

If a corresponding light pulse is not received for a particular transmitted light pulse, then LiDAR system 500 may determine that there are no objects within a detectable range of LiDAR system 500 (e.g., an object is beyond the maximum scanning distance of LiDAR system 500). For example, in FIG. 5B, light pulse 526 may not have a corresponding return light pulse (as illustrated in FIG. 5C) because light pulse 526 may not produce a scattering event along its transmission path 528 within the predetermined detection range. LiDAR system 500, or an external system in communication with LiDAR system 500 (e.g., a cloud system or service), can interpret the lack of return light pulse as no object being disposed along light path 528 within the detectable range of LiDAR system 500.

In FIG. 5B, light pulses 502, 522, 526, and 530 can be transmitted in any order, serially, in parallel, or based on other timings with respect to each other. Additionally, while FIG. 5B depicts transmitted light pulses as being directed in one dimension or one plane (e.g., the plane of the paper), LiDAR system 500 can also direct transmitted light pulses along other dimension(s) or plane(s). For example, LiDAR system 500 can also direct transmitted light pulses in a dimension or plane that is perpendicular to the dimension or plane shown in FIG. 5B, thereby forming a 2-dimensional transmission of the light pulses. This 2-dimensional transmission of the light pulses can be point-by-point, line-by-line, all at once, or in some other manner. That is, LiDAR system 500 can be configured to perform a point scan, a line scan, a one-shot without scanning, or a combination thereof. A point cloud or image from a 1-dimensional transmission of light pulses (e.g., a single horizontal line) can generate 2-dimensional data (e.g., (1) data from the horizontal transmission direction and (2) the range or distance to objects). Similarly, a point cloud or image from a 2-dimensional transmission of light pulses can generate 3-dimensional data (e.g., (1) data from the horizontal transmission direction, (2) data from the vertical transmission direction, and (3) the range or distance to objects). In general, a LiDAR system performing an n-dimensional transmission of light pulses generates (n+1) dimensional data. This is because the LiDAR system can measure the depth of an object or the range/distance to the object, which provides the extra dimension of data. Therefore, a 2D scanning by a LiDAR system can generate a 3D point cloud for mapping the external environment of the LiDAR system.

The density of a point cloud refers to the number of measurements (data points) per area performed by the LiDAR system. A point cloud density relates to the LiDAR scanning resolution. Typically, a larger point cloud density, and therefore a higher resolution, is desired at least for the region of interest (ROI). The density of points in a point cloud or image generated by a LiDAR system is equal to the number of pulses divided by the field of view. In some embodiments, the field of view can be fixed. Therefore, to increase the density of points generated by one set of transmission-receiving optics (or transceiver optics), the LiDAR system may need to generate a pulse more frequently. In other words, a light source in the LiDAR system may have a higher pulse repetition rate (PRR). On the other hand, by generating and transmitting pulses more frequently, the farthest distance that the LiDAR system can detect may be limited. For example, if a return signal from a distant object is received after the system transmits the next pulse, the return signals may be detected in a different order than the order in which the corresponding signals are transmitted, thereby causing ambiguity if the system cannot correctly correlate the return signals with the transmitted signals.

To illustrate, consider an example LiDAR system that can transmit laser pulses with a pulse repetition rate between 500 kHz and 1 MHz. Based on the time it takes for a pulse to return to the LiDAR system and to avoid mix-up of return pulses from consecutive pulses in a typical LiDAR design, the farthest distance the LiDAR system can detect may be 300 meters and 150 meters for 500 kHz and 1 MHz, respectively. The density of points of a LiDAR system with 500 kHz repetition rate is half of that with 1 MHz. Thus, this example demonstrates that, if the system cannot correctly correlate return signals that arrive out of order, increasing the repetition rate from 500 kHz to 1 MHz (and thus improving the density of points of the system) may reduce the detection range of the system. Various techniques are used to mitigate the tradeoff between higher PRR and limited detection range. For example, multiple wavelengths can be used for detecting objects in different ranges. Optical and/or signal processing techniques (e.g., pulse encoding techniques) are also used to correlate between transmitted and return light signals.

Various systems, apparatus, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Various systems, apparatus, and methods described herein may be implemented using computers operating in a client-server relationship. Typically, in such a system, the client computers are located remotely from the server computers and interact via a network. The client-server relationship may be defined and controlled by computer programs running on the respective client and server computers. Examples of client computers can include desktop computers, workstations, portable computers, cellular smartphones, tablets, or other types of computing devices.

Figure 11:
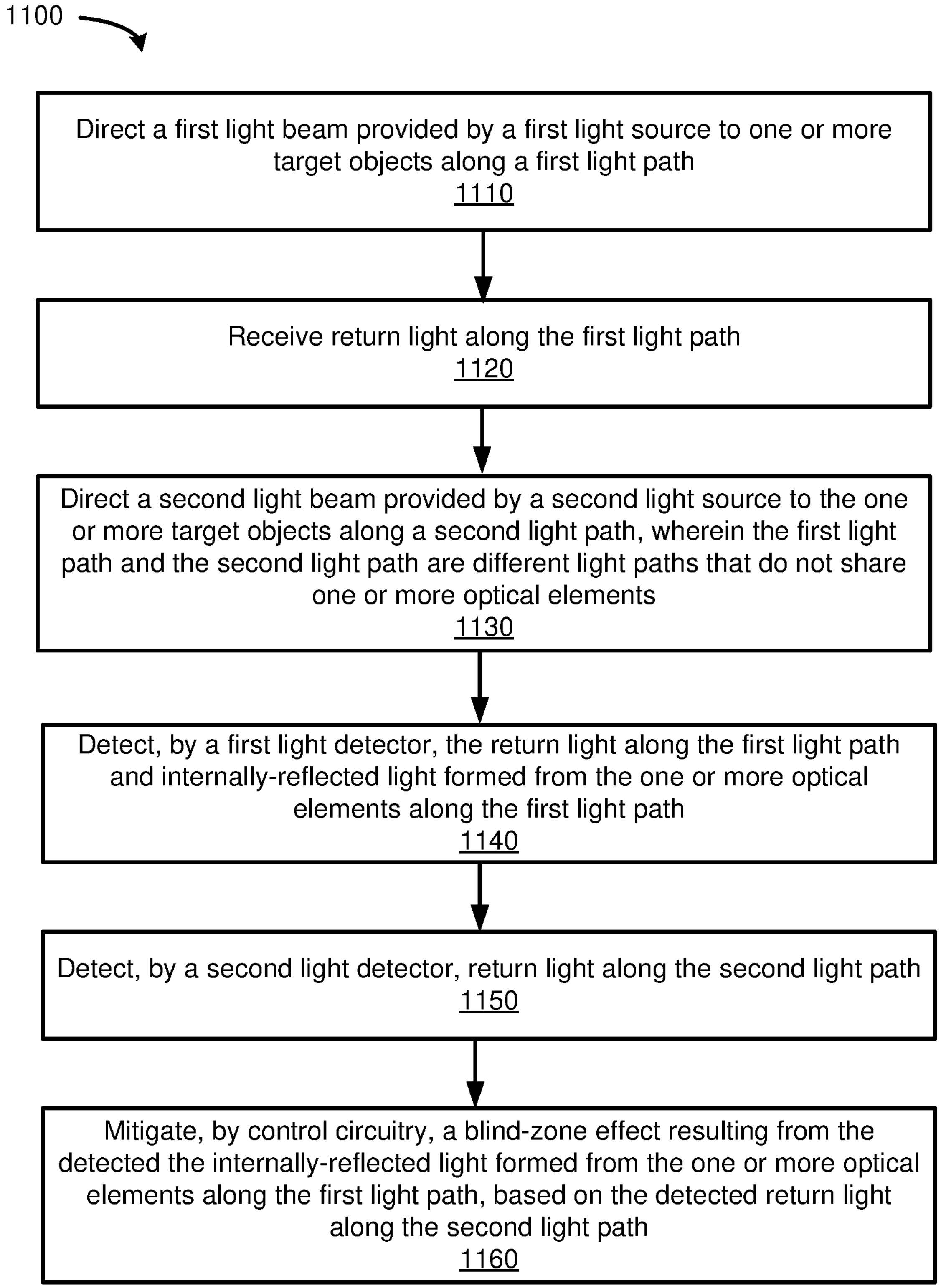
FIG. 11 is a flowchart illustrating a method for performing LiDAR scanning with zero blind-zone using a dual emitting co-axial LiDAR system according to one embodiment.

Various systems, apparatus, and methods described herein may be implemented using a computer program product tangibly embodied in an information carrier, e.g., in a non-transitory machine-readable storage device, for execution by a programmable processor; and the method processes and steps described herein, including one or more of the steps of FIG. 11, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 6:
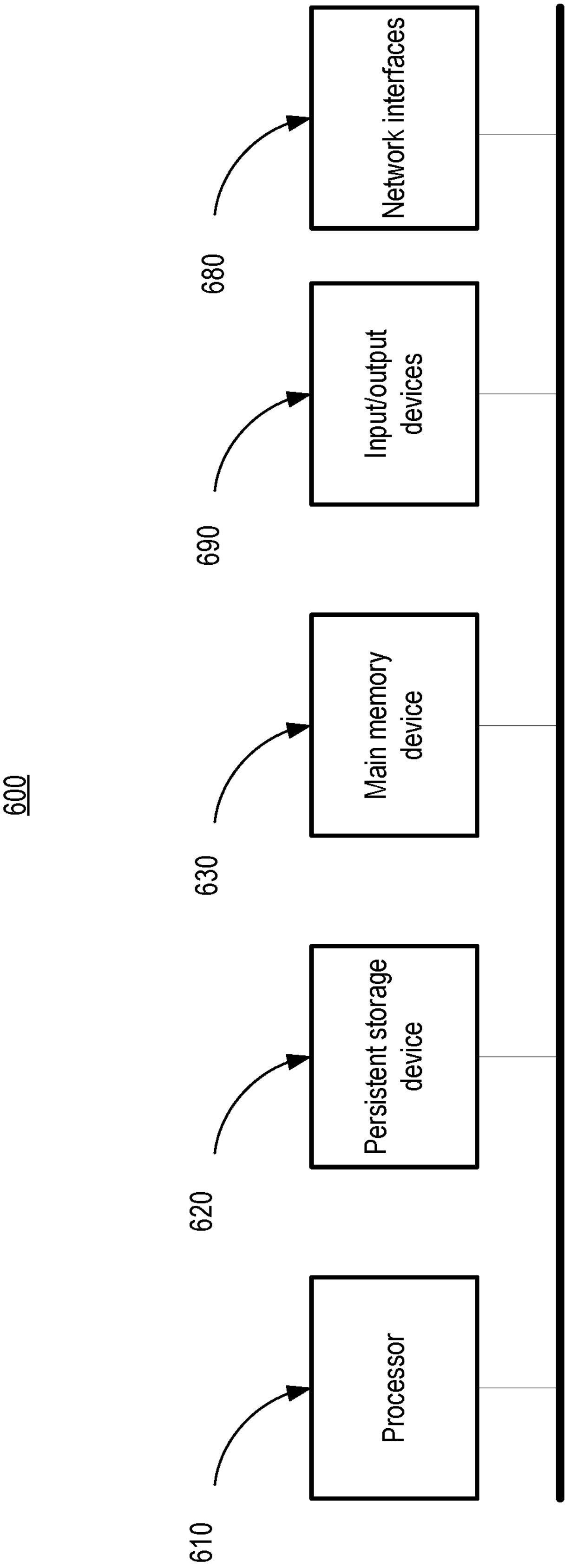
FIG. 6 is a block diagram illustrating an example apparatus used to implement systems, apparatus, and methods in various embodiments.

A high-level block diagram of an example apparatus that may be used to implement systems, apparatus and methods described herein is illustrated in FIG. 6. Apparatus 600 comprises a processor 610 operatively coupled to a persistent storage device 620 and a main memory device 630. Processor 610 controls the overall operation of apparatus 600 by executing computer program instructions that define such operations. The computer program instructions may be stored in persistent storage device 620, or other computer-readable medium, and loaded into main memory device 630 when execution of the computer program instructions is desired. For example, processor 610 may be used to implement one or more components and systems described herein, such as control circuitry 350 (shown in FIG. 3), vehicle perception and planning system 220 (shown in FIG. 2), and vehicle control system 280 (shown in FIG. 2). Thus, the method steps of FIG. 11 can be defined by the computer program instructions stored in main memory device 630 and/or persistent storage device 620 and controlled by processor 610 executing the computer program instructions. For example, the computer program instructions can be implemented as computer executable code programmed by one skilled in the art to perform an algorithm defined by the method steps discussed herein in connection with FIG. 11. Accordingly, by executing the computer program instructions, the processor 610 executes an algorithm defined by the method steps of these aforementioned figures. Apparatus 600 also includes one or more network interfaces 680 for communicating with other devices via a network. Apparatus 600 may also include one or more input/output devices 690 that enable user interaction with apparatus 600 (e.g., display, keyboard, mouse, speakers, buttons, etc.).

Processor 610 may include both general and special purpose microprocessors and may be the sole processor or one of multiple processors of apparatus 600. Processor 610 may comprise one or more central processing units (CPUs), and one or more graphics processing units (GPUs), which, for example, may work separately from and/or multi-task with one or more CPUs to accelerate processing, e.g., for various image processing applications described herein. Processor 610, persistent storage device 620, and/or main memory device 630 may include, be supplemented by, or incorporated in, one or more application-specific integrated circuits (ASICs) and/or one or more field programmable gate arrays (FPGAs).

Persistent storage device 620 and main memory device 630 each comprise a tangible non-transitory computer readable storage medium. Persistent storage device 620, and main memory device 630, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 690 may include peripherals, such as a printer, scanner, display screen, etc. For example, input/output devices 690 may include a display device such as a cathode ray tube (CRT), plasma or liquid crystal display (LCD) monitor for displaying information to a user, a keyboard, and a pointing device such as a mouse or a trackball by which the user can provide input to apparatus 600.

Any or all of the functions of the systems and apparatuses discussed herein may be performed by processor 610, and/or incorporated in, an apparatus or a system such as LiDAR system 300. Further, LiDAR system 300 and/or apparatus 600 may utilize one or more neural networks or other deep-learning techniques performed by processor 610 or other systems or apparatuses discussed herein.

One skilled in the art will recognize that an implementation of an actual computer or computer system may have other structures and may contain other components as well, and that FIG. 6 is a high-level representation of some of the components of such a computer for illustrative purposes.

A "blind zone" of a LiDAR system, as used in the present disclosure, is different from a "blind-spot" of a LiDAR system. "Blind-spot" of a LiDAR system refers to areas that are outside the LiDAR system's field-of-view. For instance, for a LiDAR system with a 120° horizontal field-of-view, its blind-spot would cover the remaining 240° in the horizontal field-of-view. On the other hand, a "blind zone" of a LiDAR system refers to a specific zone within the LiDAR system's field-of-view where it cannot detect or accurately measure objects that fall within the zone. A blind zone of a LiDAR system is illustrated in greater detail in FIGS. 7A to 8C.

Figure 7A:
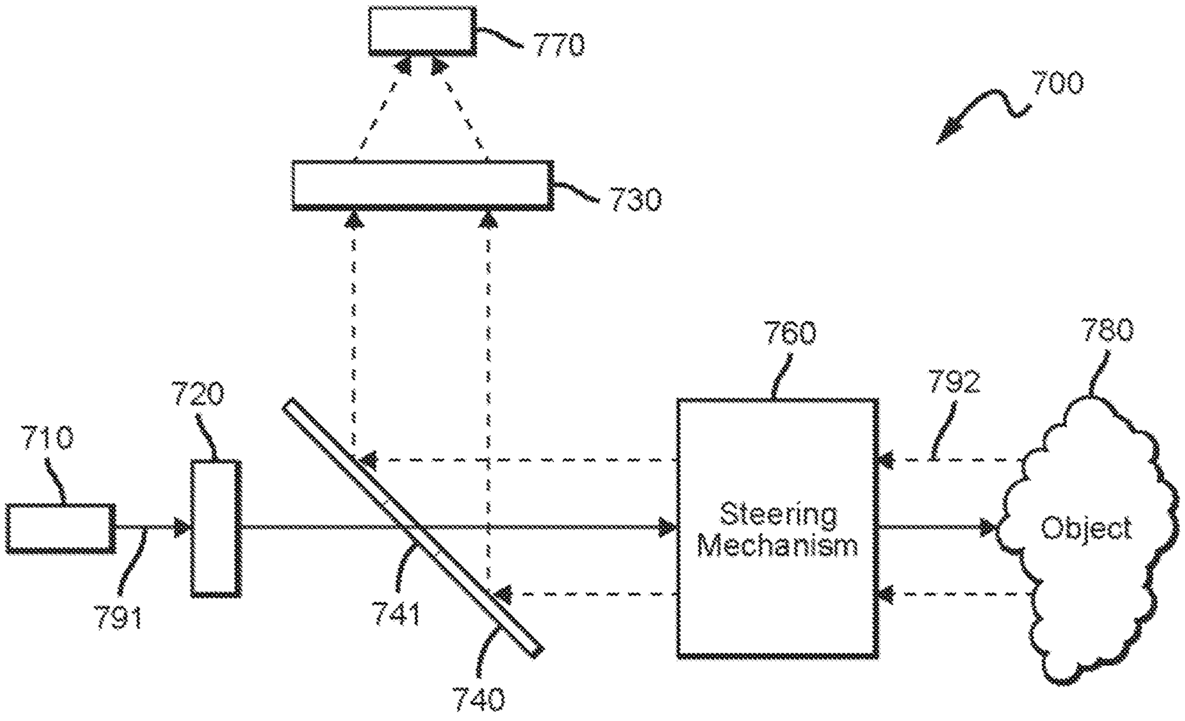
FIG. 7A is a block diagram illustrating an exemplary LiDAR system having two lenses.

FIG. 7A is a block diagram illustrating an exemplary LiDAR system 700 having two lenses. LiDAR system 700 includes laser source 710, collimation lens 720, receiving lens 730, combining mirror 740, steering mechanism 760, and light detector 770. In one embodiment, laser source 710 generates one or more outgoing light pulses, which form one or more outgoing light beams. One of the outgoing light beams is depicted as light beam 791. The outgoing light beams are directed towards and collimated by collimation lens 720. Combining mirror 740 has an opening 741, which allows the outgoing light beams to pass through. In other embodiments, combining mirror 740 may have multiple openings. In one embodiment, only one side of combining mirror 740, specifically the side opposite to laser source 710, is reflective.

The outgoing light beams (e.g., beam 791) pass through opening 741 and are directed towards steering mechanism 760, which operates similarly to the steering mechanism 340 shown in FIG. 3. Steering mechanism 760 scans the field-of-view in multiple dimensions, such as in horizontal and vertical dimensions, using the outgoing light beams. When the outgoing light beams encounter objects in the field-of-view, such as object 780, they are scattered to form return light 792. Return light 792 is directed back towards steering mechanism 760. Steering mechanism 760 then directs the return light 792 to the reflective surface of combining mirror 741, which redirects them to the receiving lens 730. The receiving lens 730 focuses the return light and directs it towards light detector 770. Light detector 770 detects each light pulse of the return light (hereinafter referred to as the "return light pulses"). Based on the timing of the outgoing and return light pulses, LiDAR system 700 can calculate the time-of-flight of the light pulses to determine the distance to object 780 in the light path.

Figure 7B:
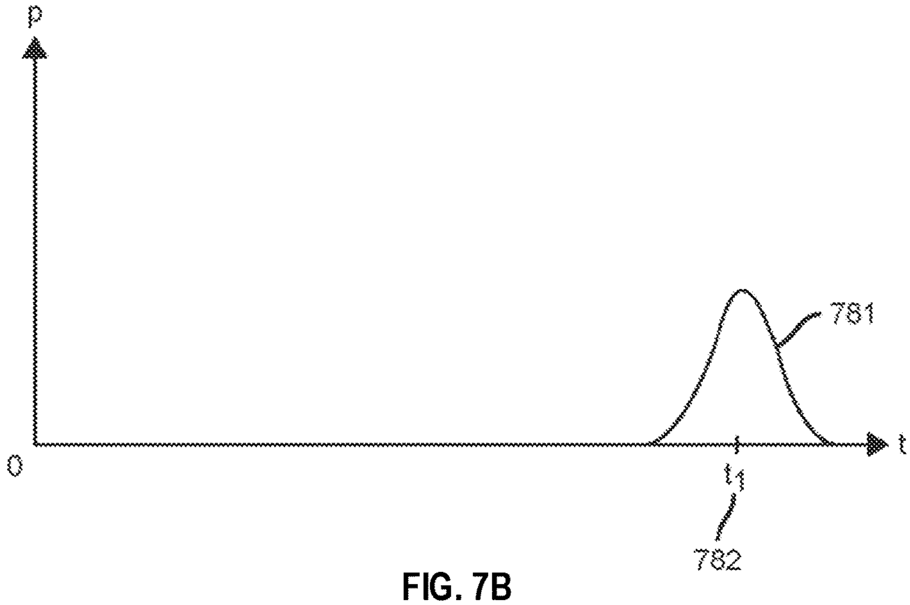
FIG. 7B illustrates an example return light pulse detected by a light detector in a LiDAR system.

FIG. 7B illustrates an example return light pulse detected by light detector 770 in LiDAR system 700. The t-axis (horizontal axis) is the time axis representing the lapse of time. The origin of the t-axis is the start time when laser source 710 generates an outgoing light pulse. In some embodiments, if the time taken by the outgoing light pulse to travel within the LiDAR system is negligible, the start time is measured from when the pulse exits the LiDAR system. Waveform 781 is the analog waveform of a return light pulse detected by light detector 770. The p-axis (vertical axis) represents the voltage amplitude of the waveform.

A return light pulse waveform has a certain duration, typically spanning a few nanoseconds. There are different approaches for accurately determining the timing of a return light pulse, such as pulse-center based method or pulse-edge based method, etc. Methods for determining the timing of a return light pulse is described in more detail in U.S. non-provisional patent application Ser. No. 18/126,053, filed on Mar. 24, 2023, entitled "A Method For Accurate Time-Of-Flight Calculation On The Cost-Effective TOF LiDAR System", the content of which is incorporated by reference in it is entirety for all purposes. Time 782 ($t_1$) represents the timing of return light pulse 781, and is calculated using one of the methods described in the aforementioned patent application. In other embodiments, $t_1$ may be calculated using other methods.

LiDAR system 700 determines the distance to object 780 by measuring the time-of-flight of a light pulse from the time when the light pulse is generated to the time when the light pulse scattered from object 780 arrives back at LiDAR system 700. The distance from LiDAR system 700 to object 780 can then be determined by multiplying the time-of-flight and the speed of light, and then dividing the multiplication result by 2. The time-of-flight of the return light pulse 781 is $t_1$ because it represents the travel time from when the corresponding outgoing pulse is generated (at time 0) to the time when the return light pulse 781 is received at the LiDAR system (at time $t_1$).

Figure 8A:
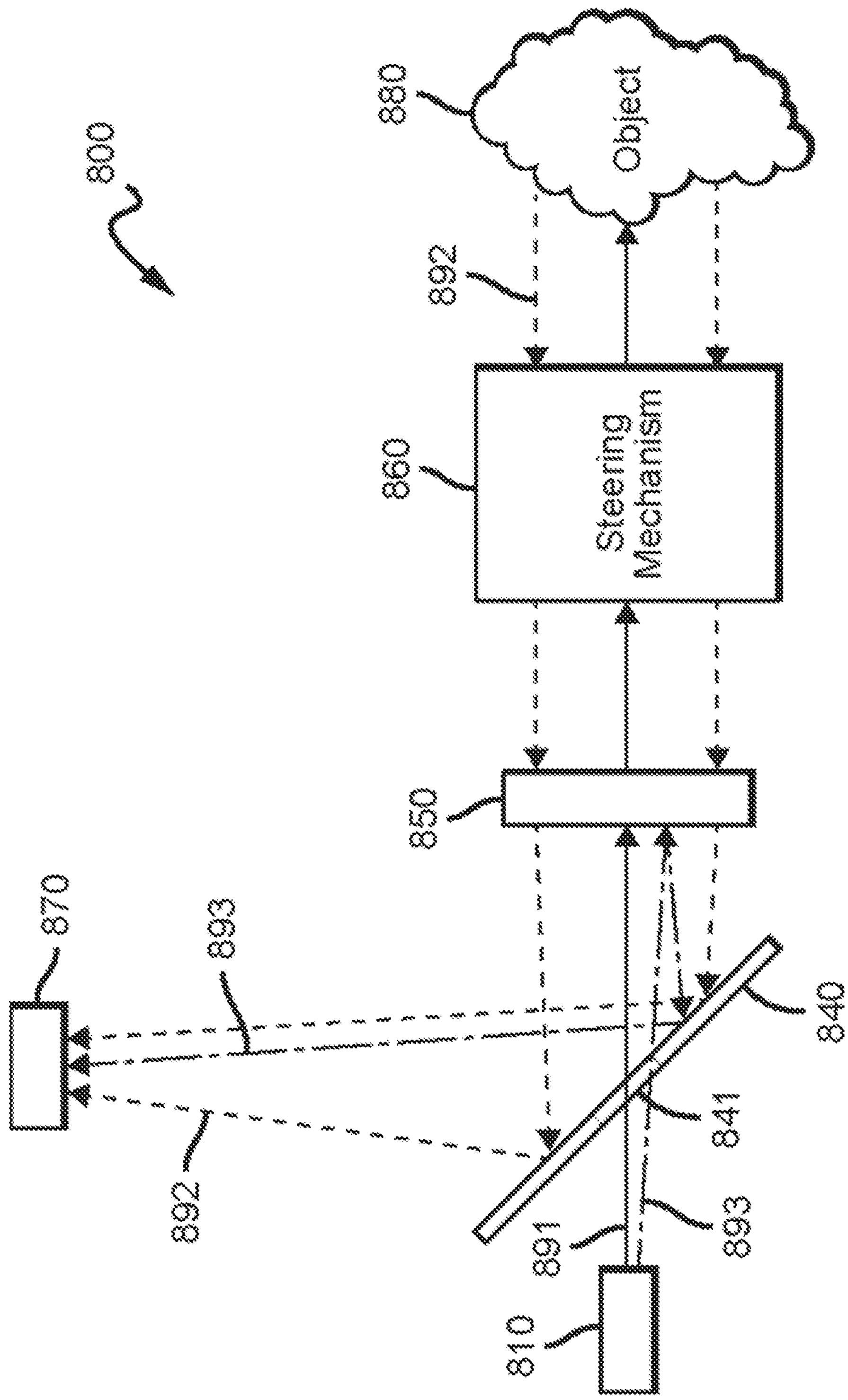
FIG. 8A is a block diagram illustrating an exemplary co-axial LiDAR system having only one lens according to one embodiment.

FIG. 8A illustrates a schematic view of an exemplary co-axial LiDAR system having shared optics (e.g., using only one lens) according to one embodiment. LiDAR system 800 is similar to LiDAR system 700, but it utilizes only one lens. LiDAR system 800 includes laser source 810, combining mirror 840, shared lens 850, steering mechanism 860, and light detector 870. In a coaxial LIDAR system, the laser emission path and the light reception path are substantially co-axial or parallel within the system. In the configuration of a co-axial LiDAR system 800, both light source 810 and light detector 870 share a single optical lens 850.

In one embodiment, laser source 810 generates one or more outgoing light pulses, which form one or more outgoing light beams. One of the outgoing light beams is depicted as light beam 891. The outgoing light beams pass through opening 841 of combining mirror 840. In other embodiments, combining mirror 840 may have multiple openings. Only one side of combining mirror 840, specifically the side opposite to laser source 810, is reflective. Once the outgoing light beam 891 passes through opening 841, it is directed towards shared lens 850. Shared lens 850 is designed such that it can collimate light coming from one direction (e.g., from light source 810) and focus light coming from the opposite direction (e.g., from steering mechanism 860). In other embodiments, shared lens 850 may be a hybrid lens or other types of lens that enables the outgoing and returning light paths to share the same lens.

Steering mechanism 860 operates similarly to the steering mechanism 340 in FIG. 3 and steering mechanism 760 in FIG. 7A, scanning the field-of-view in multiple dimensions using the outgoing light beams. As the outgoing light beams encounter objects in the field-of-view, such as object 880, they are scattered and some of the return light 892 is directed back towards steering mechanism 860. Steering mechanism 860 then directs the return light 892 to shared lens 850, which focuses the return light 892 and directs it to the reflective surface of combining mirror 840. Combining mirror 840 then redirects the return light 892 towards light detector 870. Because the return light 892 are already being focused by shared lens 850 as it reaches combining mirror 840, return light 892 can be continuously focused while being redirected towards light detector 870. Light detector 870 then detects each light pulse of the return light 892. Based on the timing of the outgoing and return light pulses, LiDAR system 800 calculates the time-of-flight of the light pulses to determine the distance to object 880 in the light path.

The co-axial LiDAR system 800 can be highly compact because it has a lens that is shared by both the laser emission path and the light reception path. However, the shared lens configuration may result in areas of the field-of-view that cannot be accurately detected or measured by the LiDAR system, due to the blind-zone effect.

In a LiDAR system, lenses direct and modify the paths of laser light. Depending on their specific functions within the system, lenses may collimate, focus, or redirect light towards a particular direction. However, some lenses may exhibit partial reflectivity due to their material composition and/or surface properties. For example, a glass lens may scatter or reflect back a small fraction of the light passing through it in the opposite direction. Referring still to FIG. 8A, another outgoing light beam generated by laser source 810 is depicted as light beam 893. Similar to light beam 891, light beam 893 also passes through opening 841 of combining mirror 840 and is directed towards shared lens 850. Due to the partial reflectivity of lens 850, although a majority portion of light beam 893 passes through lens 850 and eventually hits object 880 and returns (not shown in the figure), a small fraction of light beam 893 is reflected back by lens 850 to the reflective surface of combination mirror 840. From there, it is redirected towards light detector 870 as lens-reflected light beam 893 (also referred to as internally-reflected light). Light detector 870 may also detect each light pulse of the lens-reflected light beam 893. However, this pulse is not reflected by any physical object in the field-of-view. Thus, calculating the "time-of-flight" of the lens-reflected light pulse is irrelevant and can lead to errors in the system.

Figure 8B:
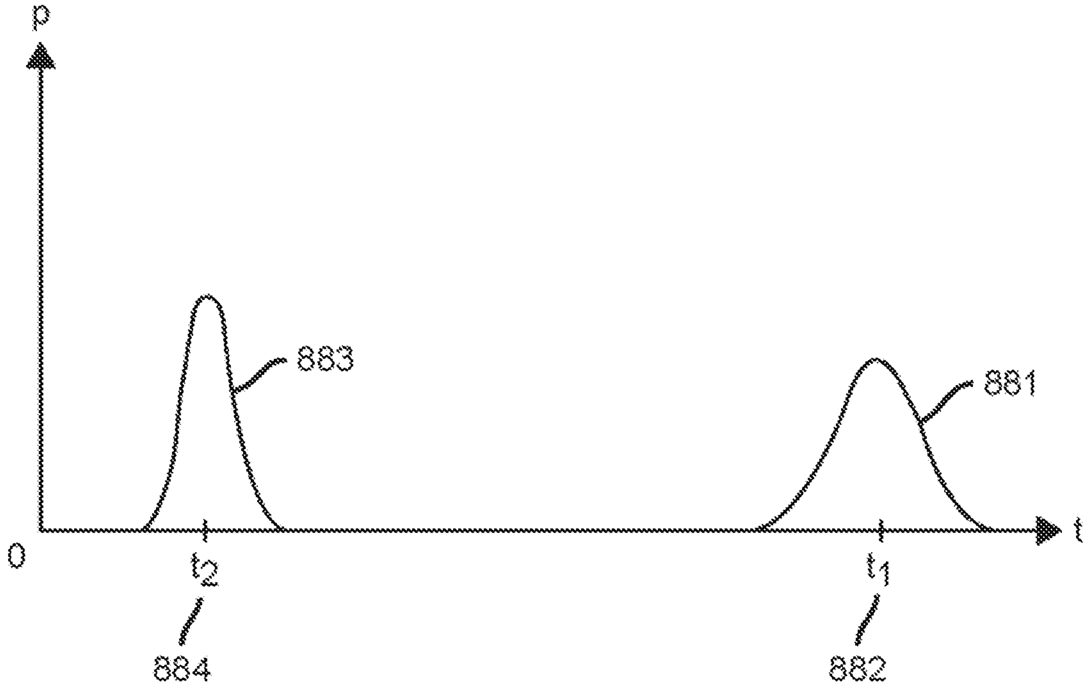
FIG. 8B illustrates a lens-reflected light pulse and an object-reflected return light pulse detected by a light detector in a co-axial LiDAR system.

FIG. 8B illustrates a lens-reflected light pulse and an object-reflected return light pulse, both detected by light detector 870 in LiDAR system 800. Both light pulses originate from the same outgoing light pulse generated by light source 810. When the outgoing light pulse reaches lens 850, a part of the light pulse is reflected by lens 850 and combining mirror 840, and is detected by light detector 870 as waveform 883 (also referred to as lens-reflected light pulse 883). The remaining portion of the pulse continues to travel through lens 850, hits object 880, returns, and is detected by light detector 870 as waveform 881 (also referred to as object-reflected return light pulse 881). Waveform 881 may be the same as waveform 781 in FIG. 7B, assuming that object 780 and object 880 are the same object and at the same distance with respect to the LiDAR system.

In FIG. 8B, the t-axis (horizontal axis) is the time axis representing the lapse of time. The origin of the t-axis is the start time when laser source 810 generates the outgoing light pulse. The p-axis (vertical axis) represents the voltage amplitude of the waveforms. Time 882 ($t_1$) represents the timing of the object-reflected return light pulse 881. Time 884 ($t_2$) represents the timing of the lens-reflected light pulse 883. Because lens 850 is always closer to light detector 870 than any physical object in the field-of-view, $t_2$ is always less than $t_1$.

The distance that light can travel in one nanosecond is approximately 0.3 meters. Assuming the distance of lens-reflected light pulse may travel is 0.3 meters, $t_2$ is approximately 1 ns. If the distance of object 880 is 15 meters away, the roundtrip travel time of object-reflected return light pulse 881, i.e., $t_1$, is approximately 100 ns. The time interval between $t_1$ and $t_2$ can be approximately 100 ns if the object is 15 meters away. As the width of a return pulse typically spans several nanoseconds, e.g., about 3 ns, 4 ns, or 6 ns, etc., it is easy to distinguish waveform 883 from waveform 881 when they are 100 ns apart. In this situation, LiDAR system 800 can ignore waveform 883 and just use the timing of waveform 881 ($t_1$) as the time-of-flight to calculate the distance of object 880. However, the blind-zone effect may occur when the object is too close to the LiDAR system, causing the two waveforms to be too close to each other or to overlap.

Figure 8C:
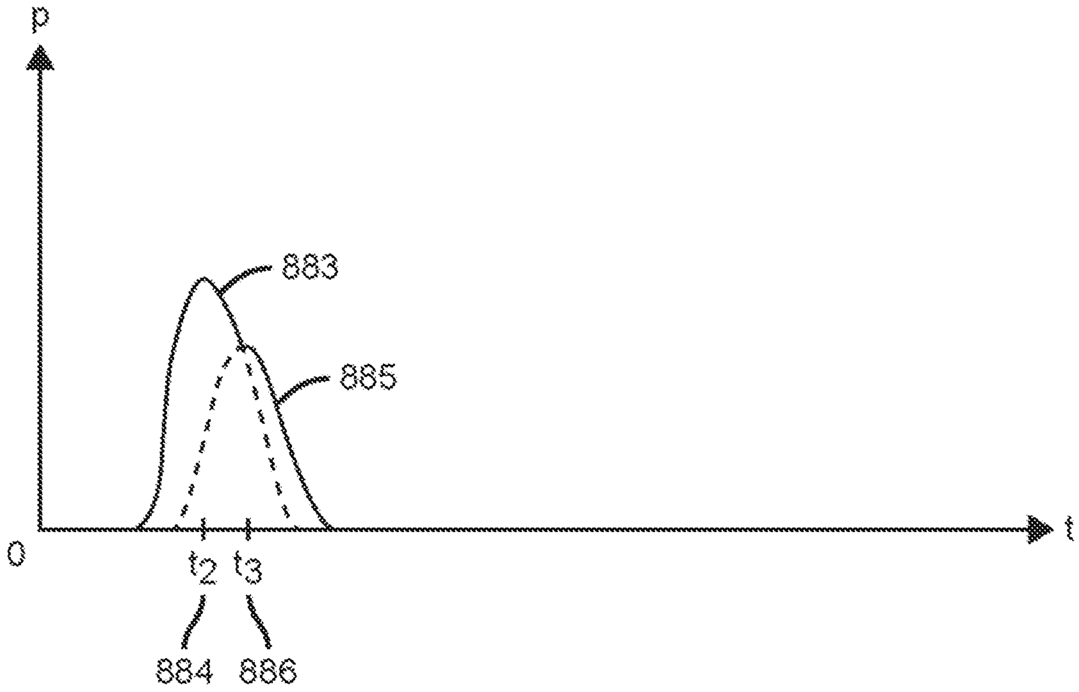
FIG. 8C illustrates the blind-zone effect when an object in the field-of-view is too close to a co-axial LiDAR system.

FIG. 8C illustrates such a blind-zone effect when object 880 in the field-of-view is too close to LiDAR system 800. Similar to FIG. 8B, in FIG. 8C, the t-axis (horizontal axis) is the time axis representing the lapse of time. The origin of the t-axis is the start time when laser source 810 generates the outgoing light pulse. The p-axis (vertical axis) represents the voltage amplitude of the waveforms. Waveform 883 is the light pulse reflected by shared lens 850 and detected by light detector 870 (also referred to as lens-reflected light pulse 883). Waveform 883 of FIG. 8C is the same as waveform 883 in FIG. 8B. The timing of lens-reflected light pulse 883 of FIG. 8C, time 884 ($t_2$), is also the same as $t_2$ in FIG. 8B. This is because waveforms 883 in both figures represent the light pulses reflected from the same shared lens 850 in LiDAR system 800.

Waveform 885 of FIG. 8C is the light pulse reflected by object 880 and detected by light detector 870 (also referred to as object-reflected light pulse 885). In the scenario depicted in FIG. 8C, the distance of object 880 is just 0.1 meters away from LiDAR system 800. Assuming that the outgoing light travels an additional 0.1 meters within LiDAR system 800 before leaving the system, the roundtrip travel distance for object-reflected light pulse 885 is 0.4 meters. Thus, the timing of object-reflected return light pulse 885, i.e., time 886 ($t_3$), is approximately 1.33 ns. Since time 886 ($t_3$) is too close to time 884 ($t_2$) (as explained above, $t_2$ is at approximately 1 ns), waveforms 883 and 885 overlap with each other.

When waveform 883 and 885 are in close proximity or overlap, it becomes challenging or difficult for light detector 870 and/or control circuitry 350 to differentiate them as separate waveforms. As depicted in FIG. 8C, the combined waveform contour closely resembles that of a single waveform, making it difficult to discern individual pulses. Furthermore, the pulse-center based method or pulse-edge based method described earlier may not reliably determine the timing of each waveform when they are too close or overlapping. As previously discussed, in the situation described in connection with FIG. 8B where the object is located far away from the LiDAR system, the system can easily distinguish waveform 881 from waveform 883 by, for example, simply disregarding the lens-reflected light pulse 883. However, in the situation shown in FIG. 8C where the object is located near the LiDAR system such that waveforms 883 and 885 overlap, they may not be differentiated, resulting in the combined waveform being treated as a single waveform that represents a lens-reflected return light pulse. Consequently, in this scenario, the LiDAR system cannot find the true return pulse of object 880. As a result, object 880 cannot be detected by the LiDAR system, causing the blind-zone effect.

Another factor contributing to the blind-zone effect is the strong partial reflection of light by the shared lens 850, which can cause a dark period on the detector 870 lasting approximately 10 ns. During this interval, the detector may partially lose its capability and become unable to detect any object-returned light pulses. In some embodiments, the blind-zone may encompass an area of approximately one to two meters from the LiDAR system.

Figure 9:
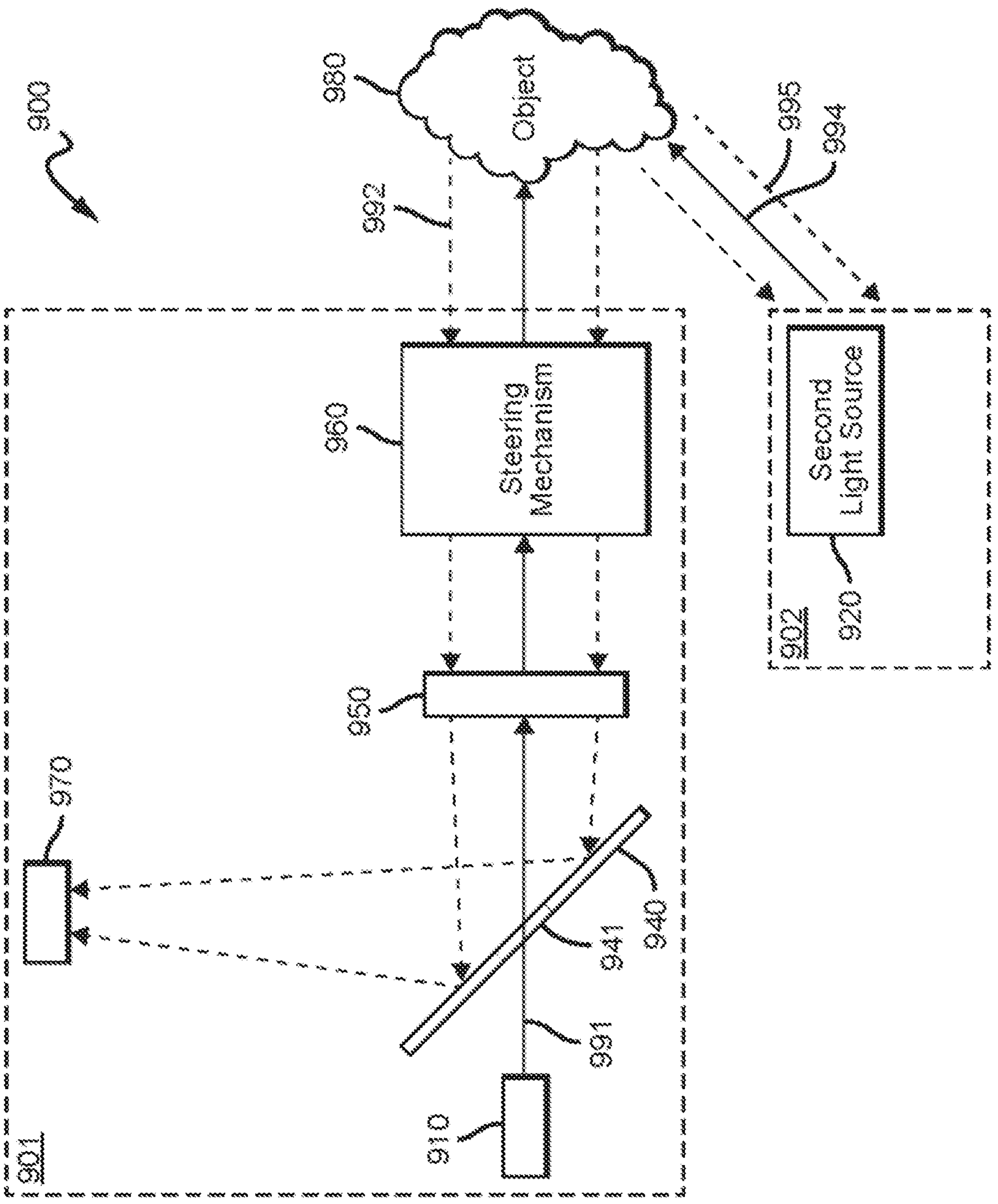
FIG. 9 is a block diagram illustrating an exemplary dual emitting co-axial LiDAR system with zero blind-zone according to one embodiment.

FIG. 9 is a block diagram illustrating an exemplary dual emitting co-axial LiDAR system 900 with zero blind-zone according to one embodiment. Dual emitting co-axial LiDAR system 900 has two LiDAR subsystems, co-axial LiDAR subsystem 901 (also referred to as the first LiDAR subsystem) and second LiDAR subsystem 902. In one embodiment, the two LiDAR subsystems 901 and 902 do not share optics with each other. In some embodiments, co-axial LiDAR subsystem 901 is similar to LiDAR system 800. In some embodiments, first light source 910 is a long-range laser emitter, and second light source 920 is a blind zone short-range laser emitter. For example, first light source 910 may be configured to generate a high powered laser beam that can enable subsystem 901 to have a far detection range (e.g., 200 meters or more). Second light source 920 may be configured to generate a low or medium powered laser beam that enables subsystem 902 to have a short detection range (e.g., a few meters). In some embodiments, first light source 910 and second light source 920 are configured to generate laser beams at different wavelengths. In one embodiment, first light source 910 generates laser beams at 905 nm. Second light source 920 generates laser light at 940 nm.

Co-axial LiDAR subsystem 901 includes first laser source 910, combining mirror 940, shared lens 950, steering mechanism 960, and light detector 970. Laser source 910 generates one or more outgoing light pulses, which form one or more outgoing light beams. One of the outgoing light beams is depicted as light beam 991. The outgoing light beams pass through opening 941 of combining mirror 940. In other embodiments, combining mirror 940 may have multiple openings. Only one side of combining mirror 940, specifically the side opposite to laser source 910, is reflective. Once the outgoing light beam 991 passes through opening 941, it is directed towards shared lens 950. Shared lens 950 is designed such that it can collimate light coming from one direction (e.g., from light source 910) and focus light coming from the opposite direction (e.g., from steering mechanism 960). In other embodiments, shared lens 950 may be a hybrid lens or other types of lens that enables the outgoing and returning light paths to share the same lens.

Steering mechanism 960 operates similarly to the steering mechanism 340 in FIG. 3 and steering mechanism 760 in FIG. 7A, scanning the field-of-view in multiple dimensions using the outgoing light beams. As the outgoing light beams encounter objects in the field-of-view, such as object 990, they are scattered to form return light 992. Return light 992 is directed back towards steering mechanism 960. Steering mechanism 960 then directs the return light 992 to shared lens 950, which focuses the return light 992 and directs it to the reflective surface of combining mirror 940. Combining mirror 940 then redirects the return light 992 towards light detector 970. Because the return light 992 is already being focused by shared lens 950 as it reaches combining mirror 940, it can be continuously focused while being redirected towards light detector 970. Light detector 970 then detects each light pulse of the return light 992. Based on the timing of the outgoing and return light pulses, co-axial LiDAR subsystem 901 calculates the time-of-flight of the light pulses to determine the distance to object 980 in the light path. Similar to LiDAR system 800, co-axial LiDAR subsystem 901 also has a shared lens 950. Consequently, the blind-zone effect may occur in co-axial LiDAR subsystem 901, if there are objects located close to subsystem 901 (e.g., within a few meters), making it unable to detect objects in close proximity. The blind-zone effect can be reduced or eliminated by using second LiDAR subsystem 902.

Second LiDAR subsystem 902 includes second light source 902, receiving optics and light detector (not shown in the figure). Second light source 902 generates outgoing laser light or beams (depicted as outgoing light beam 994) to illuminate objects in the field-of-view. When the outgoing light beam 994 encounters objects in the field-of-view, such as object 980, it is scattered to form return light 995, which travels back to second LiDAR subsystem 902. Second LiDAR subsystem 902 has its own light detector (not shown in the figure) to detect return light 995. Second LiDAR subsystem 902 may be a scanning-based LiDAR system or a non-scanning-based LiDAR. In some embodiments, second LiDAR subsystem 902 is a flash LiDAR subsystem. Flash LiDAR subsystem 902 has a two-dimensional sensor array, with a typical resolution of, for example, 320×240 pixels. Its light source (second light source 920) can simultaneously transmit a diverging, two-dimensional planar laser light (outgoing light 994) with an angular range sufficient to illuminate objects in the field-of-view in a single pulse. In some embodiments, second light source 920 is configured to transmit light beams at a larger divergence angle. In some embodiments, second light source 920 is configured to transmit light beams at a fixed direction to fully cover the field-of-view. In some embodiments, second light source 920 is configured to transmit light beams at a lower peak power. In some embodiments, second light source 920 comprises a laser array. The laser array is configured to transmit light beams in a time domain multiplex way. The receiving optics (not shown in the figure) captures return light (return light 995) in two dimensions. Compared to the co-axial LiDAR subsystem 901, flash LiDAR subsystem 902 has no moving parts, has a higher signal-to-noise ratio, and can detect objects in shorter distance.

As illustrated in FIG. 9, the light path travelled by light associated with the co-axial LiDAR subsystem 901 (outgoing beam 991 and return light 992) does not overlap with the light path travelled by light associated with the second LiDAR subsystem (outgoing beam 994 and return light 995). In some embodiments, the two light paths may partially overlap. For example, they may overlap partially from where they depart their respective subsystems to where they reach the object in the field-of-view.

LiDAR system 900 may be used to reduce or eliminate blind zone in a LiDAR system. In some embodiments, second LiDAR subsystem 902 is used to detect objects within the blind-zone of co-axial LiDAR subsystem 901, and co-axial LiDAR subsystem 901 is used to detect objects outside the blind-zone of its field-of-view. The two light sources 901 and 902 may generate outgoing light at the same time, or one after the other. In some embodiments, second light source 902 may generate outgoing light or beams first. After a short period of time, first light source 901 may then generate outgoing light beams. Objects located in the blind zone of subsystem 901 can be detected by subsystem 902 because the light paths are different for the two subsystems. For example, the blind zone for subsystem 901 is not a blind zone for subsystem 902. Therefore, subsystem 902 can detect an object located in a blind zone of subsystem 901. If objects that fall within the blind-zone of subsystem 901 are detected by subsystem 902, subsystem 901 has an expectation that after first light source 901 fires outgoing light beams, return light pulse such as waveform 885 may overlap with lens-reflected light pulse 883 as shown in FIG. 8C. Subsystem 901 may disregard the overlapped waveforms and only look for return light pulses similar to waveform 881 in FIG. 8B to detect objects that fall outside the blind-zone of its field-of-view.

Figure 10:
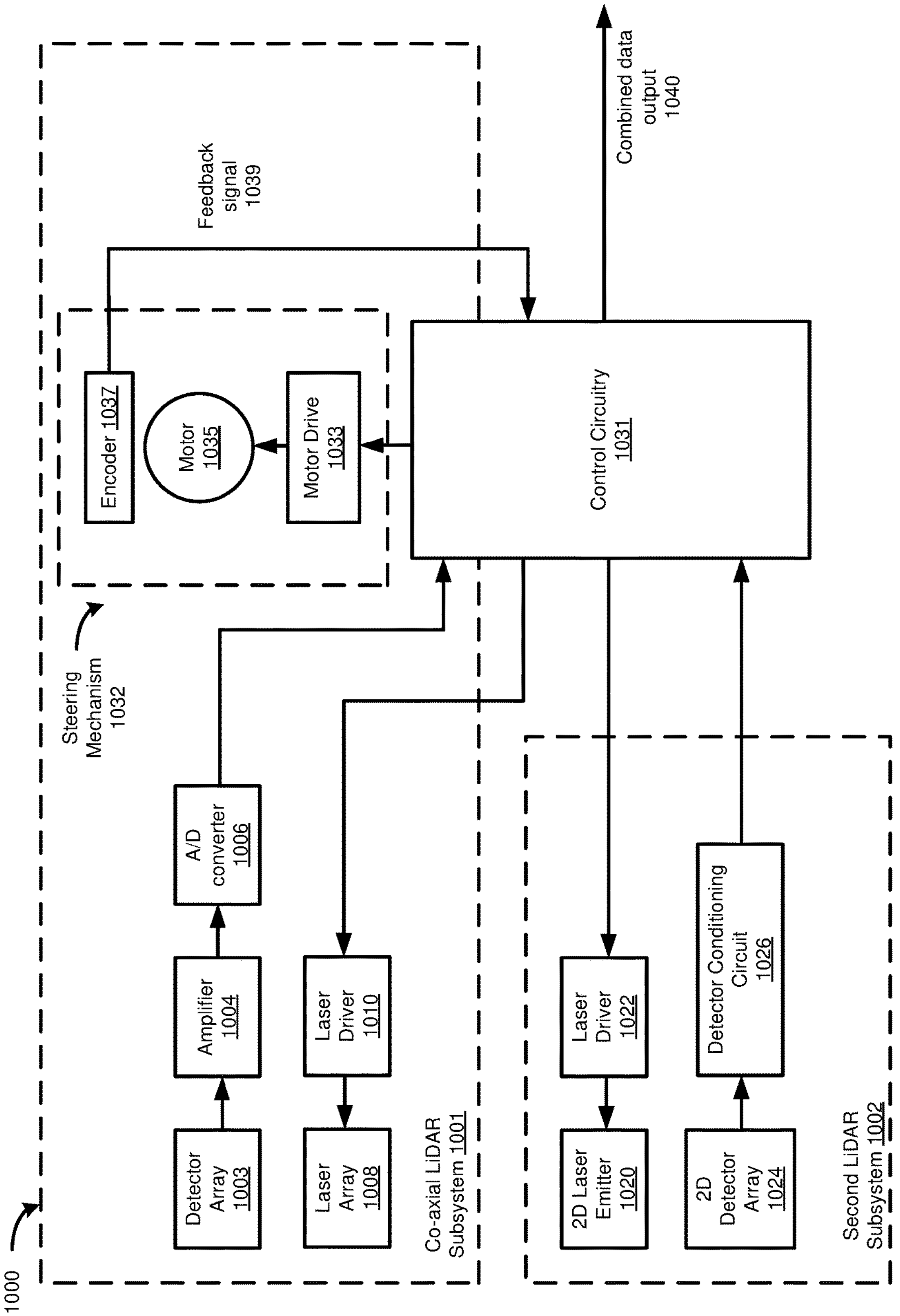
FIG. 10 is a block diagram of an exemplary dual emitting co-axial LiDAR system with zero blind-zone according to one embodiment.

FIG. 10 is a block diagram of an exemplary dual emitting co-axial LiDAR system 1000 with zero blind-zone according to one embodiment. Dual emitting co-axial LiDAR system 1000 includes two subsystems, namely, co-axial LiDAR subsystem 1001 and second LiDAR subsystem 1002. In one embodiment, the two subsystems do not share the same optics. Co-axial LiDAR subsystem 1001 includes laser array 1008 and laser driver 1010 on the transmitting side, and detector array 1003, amplifier 1004 and A/D converter 1006 on the receiving side. Laser driver 1010 is controlled by control circuitry 1031, whose control functions are similar to control circuitry 350 in FIG. 3. In one embodiment, control circuitry 1031 is shared by the two subsystems. Control circuitry 1031 could be implemented with field-programmable gate array ("FPGA") and/or System-On-Chip ("SOC"). Laser array 1008 is driven by laser driver 1010 and may have a laser emitter array of 1×8, 2×4, 1×16, 1×64, and so forth. Laser array 1008 and laser driver 1010 perform the functions of laser source 910 in FIG. 9.

Second LiDAR subsystem 1002 includes two-dimensional (2-D) laser emitter 1020 and laser driver 1022 on the transmitting side, and two-dimensional (2-D) detector array 1024 and detector conditioning circuit 1026 on the receiving side. In one embodiment, subsystem 1002 can be a flash LiDAR system. Laser driver 1022 is controlled by control circuitry 1031 to drive the 2-D laser emitter 1020 to generate 2-D planar light rays. In one embodiment, 2-D laser emitter 1020 can generate a laser field with a typical resolution of 320×240 pixels. On the receiving side, returned scattered light is detected by 2-D detector array 1024. In some embodiments, 2-D detector array 1024 has the same resolution as 2-D laser emitter 1020. In other embodiments, 2-D detector array 1024 may have a different resolution from 2-D laser emitter 1020. Light signals detected by 2-D detector array 1024 are sent to detector conditioning circuit 1026 to process timing and signal conditioning. The output of detector conditioning circuit 1026 is a digital signal of return light pulses, and is forwarded to control circuitry 1031 for processing.

In co-axial LiDAR subsystem 1001, detector array 1003 receives returned scattered light and could be in an array of 1×8, 2×4, 1×16, 1×64, and so forth. In some embodiments, the configuration of detector array 1003 matches the configuration of laser array 1008. For example, if laser array 1008 has 4 arrays of 1×8 emitters, detector array 1003 would also have 4 arrays of 1×8 detectors. In other embodiments, the configurations of detector arrays and laser arrays may be different. Output of detector array 1003 are analog electrical signals of return light pulses. The analog electrical signals are amplified by amplifier 1004 and passed to analog to digital (A/D) converter 1006. The output of A/D converter 1006 is a digital electrical signal representing return light pulses, and is forwarded to control circuitry 1031 for processing.

Co-axial LiDAR subsystem 1001 also includes a steering mechanism 1032, which includes motor drive 1033, motor 1035, and encoder 1037. The functionality of steering mechanism 1032 is similar to that of steering mechanism 960 in FIG. 9. Steering mechanism 1032 is within co-axial LiDAR subsystem 1001 and is not shared by second LiDAR subsystem 1002. In one embodiment, motor drive 1033 is controlled by control circuitry 1031 and causes motor 1035 to rotate according to a rotational speed set by control circuitry 1031. Motor 1035 is attached to one or more moveable mirrors such as one or more polygon mirrors, one or more single plane mirrors, one or more multi-plane mirrors, or the like. Rotation of motor 1035 will cause the one or more moveable mirrors to rotate or oscillate, e.g., in the same or different directions and at one or more rotational speeds. Encoder 1037 measures the actual rotational speed of motor 1035 and provides the motor's actual rotational speed as feedback signal 1039 back to control circuitry 1031. Control circuitry 1031 may, based on feedback signal 1039, adjust its control of motor drive 1033 so that motor 1035's rotational speed can be fine-tuned.

Detector array 1003 of co-axial LiDAR subsystem 1001 is configured to generate signals representing a mapping of the field-of-view for subsystem 1001. 2D detector array 1024 of second LiDAR subsystem 1002 is configured to generate signals representing a mapping of the field-of-view for subsystem 1002. To produce a complete point cloud covering data points from both subsystems, data points from both subsystems are combined in control circuitry 1031 to produce a unified point cloud. When there is overlap in the field-of-views of the two subsystems, control circuitry 1031 may choose the overlapped data points generated by one subsystem, and discard data points generated by the other subsystem for the overlapped region. In some embodiments, control circuitry 1031 may combine overlapped data points generated by the two subsystems to produce a better-quality point cloud. Co-axial LiDAR subsystem 1001 also has one shared lens (not shown in the figure). Similar to LiDAR system 900, blind-zone effect may occur in subsystem 1001, making it unable to detect objects in close proximity.

LiDAR system 1000 may be used to achieve zero blind zone for subsystem 1001. In some embodiments, second LiDAR subsystem 1002 is used to detect objects within the blind-zone of co-axial LiDAR subsystem 1001, and co-axial LiDAR subsystem 1001 is used to detect objects outside the blind-zone of its field-of-view. Laser array 1008 of subsystem 1001 and 2D laser emitter 1020 of subsystem 1002 may generate outgoing light at the same time, or one after the other. In some embodiments, 2D laser emitter 1020 of subsystem 1002 may generate outgoing light or beams first. After a short period of time, laser array 1008 of subsystem 1001 may then generate outgoing light beams. If objects that fall within the blind-zone of subsystem 1001 are detected by subsystem 1002, subsystem 1001 has an expectation that object-returned light pulse may overlap with the lens-reflected light pulse, as shown in FIG. 8C. Subsystem 1001 may disregard the overlapped waveforms and only look for return light pulses similar to waveform 881 in FIG. 8B to detect objects that fall outside the blind-zone of its field-of-view. By combining data points from both subsystems in control circuitry 1031, LiDAR system 1000 may produce a unified point cloud of its entire field-of-view with zero blind zone.

FIG. 11 is a flowchart illustrating a method for performing LiDAR scanning with zero blind-zone using a dual emitting co-axial LiDAR system according to one embodiment. In some embodiments, method 1100 may be performed by dual emitting co-axial LiDAR system 900 in FIG. 9 or dual emitting co-axial LiDAR system 1000 in FIG. 10. The dual emitting co-axial LiDAR system includes two LiDAR subsystems, a co-axial LiDAR subsystem (hereinafter, the "first subsystem") and a second LiDAR subsystem (hereinafter, the "second subsystem").

Method 1100 includes step 1110, in which the dual emitting co-axial LiDAR system directs a first light beam provided by a first light source to one or more target objects along a first light path. Method 1100 further includes step 1120, in which the dual emitting co-axial LiDAR system receives return light along the first light path. The first light path starts from where a laser source of the first subsystem generates the first light beam. The first light beam is then directed towards one or more optical elements (e.g., mirrors and lenses, etc.). The one or more optical elements direct the first light beam towards a steering mechanism, which operates similarly to steering mechanism 960 in FIG. 9. Steering mechanism scans the field-of-view in multiple dimensions using the first light beam. As the first light beam leaves the first subsystem and encounters objects in the field-of-view, it scatters and a portion of it is reflected back to the steering mechanism. The steering mechanism then redirects the return light formed from the first light beam to one or more optical elements, which guide the return light towards a first light detector of the first subsystem, marking the end of the first light path. As described herein, the first light beam travels along the first light path within the first subsystem, except when it leaves the subsystem to reach an object and returns back.

Method 1100 further includes step 1130, in which the dual emitting co-axial LiDAR system directs a second light beam provided by a second light source to the one or more target objects along a second light path, wherein the first light path and the second light path are different light paths that do not share one or more optical elements. The second light path starts from where a light source of the second subsystem (e.g., 2D laser emitter 1020) generates the second light beam to illuminate objects in the field-of-view. When the second light beam encounters objects in the field-of-view, it scatters and a portion of it is reflected back to the second subsystem. The second light path ends when a second light detector of the second subsystem (e.g., 2D detector array 1024) receives and detects the second light beam. As described herein, the second light beam travels along the second light path within the second subsystem, except when it leaves the subsystem to reach an object and returns back. As illustrated in FIG. 9, the first light path (traversed by outgoing light beam 991 and return light 992) and the second light path (traversed by outgoing light beam 994 and return light 995) are two different light paths that do not overlap, nor do they share any optical elements. In other embodiments, the first light path and the second light path at least partially overlap. For example, the two light paths may overlap partially from where they depart their respective subsystems to where they reach the object in the field-of-view.

Method 1100 further includes step 1140, in which the first light detector detects the return light along the first light path and internally-reflected light formed from the one or more optical elements along the first light path. As previously described, when the first light beam reaches an optical element of the first subsystem, a part of the light is reflected by the optical element and is directed towards, and detected by, the first light detector as an internally-reflected light. The first light detector also detects the return light reflected from the objects in the field-of-view along the first light path. Method 1100 further includes step 1150, in which a second light detector detects return light along the second light path. As previously described, the return light reflected from the objects in the field-of-view along the second light path is received by the second subsystem and detected by the second light detector.

Method 1100 further includes step 1160, in which control circuitry mitigates a blind-zone effect resulting from the detected the internally-reflected light formed from the one or more optical elements along the first light path, based on the detected return light along the second light path. As previously described, the blind-zone effect is at least partially caused by the internally-reflected light being reflected by the one or more optical elements of the first subsystem and detected by the first light detector. The first light source and the second light source may generate outgoing light beams at the same time, or one after the other. In some embodiments, the second light source may generate the second light beam first. After a short period of time, the first light source may generate the first light beam. In some embodiments, the second subsystem is used to detect objects within the blind-zone of the first subsystem, and the first subsystem is used to detect objects outside the blind-zone of its field-of-view. As described above in FIG. 10, data points corresponding to objects within and outside the blind-zone of the first subsystem are combined in control circuitry 1031 to mitigate the blind-zone effect, so that the dual emitting co-axial LiDAR system may produce a unified point cloud of its entire field-of-view.

The foregoing specification is to be understood as being in every respect illustrative and exemplary, but not restrictive, and the scope of the invention disclosed herein is not to be determined from the specification, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

What is claimed is:

1. A dual emitting co axial light detection and ranging (LiDAR) system comprising:

a first light source configured to provide a first light beam;

a second light source configured to provide a second light beam;

a first light detector configured to detect return light formed by scattering the first light beam by a target in a field of view;

one or more optical elements configured to transmit the first light beam from the first light source to the target in the field of view and to direct the return light to the first light detector, wherein the one or more optical elements are disposed outside of a light path of the second light beam from the second light source; and wherein the first light detector is configured to detect internally-reflected light formed by partially reflecting the first light beam by at least one of the one or more optical elements;

a second light detector configured to detect return light formed from the second light beam; and control circuitry configured to mitigate a blind-zone effect resulting from the internally-reflected light detected by the first light detector, based on the detected return light formed from the second light beam.

2. The LiDAR system of claim 1, wherein the first light source facilitates a longer range detection compared to the second light source.

3. The LiDAR system of claim 1, wherein the second light source is a part of a flash LiDAR system.

4. The LiDAR system of claim 1, wherein the second light source is configured to transmit the second light beam before the first light source transmitting the first light beam.

5. The LiDAR system of claim 1, wherein the second light source is configured to transmit the second light beam at a larger divergence angle.

6. The LiDAR system of claim 1, wherein the second light source is configured to transmit the second light beam at a fixed direction to fully cover the field of view.

7. The LiDAR system of claim 1, wherein the second light source comprises a laser array.

8. The LiDAR system of claim 7, wherein the laser array is configured to transmit the second light beam in a time domain multiplex way.

9. The LiDAR system of claim 7, wherein each element of the laser array is configured to partially cover the field of view.

10. The LiDAR system of claim 1, wherein the second light source is configured to transmit the second light beam at a lower peak power.

11. The LiDAR system of claim 1, wherein the one or more optical elements comprise a combining mirror configured to allow at least a part of the first light beam to travel through and to redirect the return light to the first light detector.

12. The LiDAR system of claim 11, wherein the one or more optical elements comprise a lens configured to collect the return light and direct the return light to the combining mirror.

13. The LiDAR system of claim 1, wherein a light path of the first light beam and the light path of the second light beam at least partially overlap.

14. A method for performing LiDAR scanning using a LiDAR scanning system comprising:

directing a first light beam provided by a first light source to one or more target objects along a first light path;

receiving return light along the first light path;

directing a second light beam provided by a second light source to the one or more target objects along a second light path, wherein the first light path and the second light path are different light paths that do not share one or more optical elements;

detecting, by a first light detector, the return light along the first light path and internally-reflected light formed from the one or more optical elements along the first light path;

detecting, by a second light detector, return light along the second light path;

mitigating, by control circuitry, a blind-zone effect resulting from the detected the internally-reflected light formed from the one or more optical elements along the first light path, based on the detected return light along the second light path.

15. The method of claim 14, wherein the first light source facilitates a longer range detection compared to the second light source.

16. The method of claim 14, wherein the second light source is a part of a flash LiDAR system.

17. The method of claim 14, wherein the second light source is configured to transmit the second light beam before the first light source transmitting the first light beam.

18. The method of claim 14, wherein the second light source is configured to transmit the second light beam at a larger divergence angle.

19. The method of claim 14, wherein the second light source comprises a laser array.

20. The method of claim 14, wherein the first light path and the second light path at least partially overlap.

* * * * *